US011620853B2

(12) United States Patent
Furuya

(10) Patent No.: US 11,620,853 B2
(45) Date of Patent: Apr. 4, 2023

(54) IMAGE DISCRIMINATION APPARATUS, IMAGE DISCRIMINATION METHOD, PROGRAM OF IMAGE DISCRIMINATION APPARATUS, AND RECORDING MEDIUM ON WHICH PROGRAM IS STORED

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/351,391

(22) Filed: Mar. 12, 2019

(65) Prior Publication Data
US 2019/0286888 A1 Sep. 19, 2019

(30) Foreign Application Priority Data

Mar. 15, 2018 (JP) .............................. JP2018-047743

(51) Int. Cl.
*G06V 40/16* (2022.01)
*G06T 7/70* (2017.01)
*G06T 7/00* (2017.01)

(52) U.S. Cl.
CPC .......... *G06V 40/172* (2022.01); *G06T 7/0002* (2013.01); *G06T 7/70* (2017.01); *G06V 40/161* (2022.01)

(58) Field of Classification Search
CPC ......... G06T 2207/30196; G06T 7/0002; G06T 7/70; G06K 9/00228; G06K 9/00288;
(Continued)

(56) References Cited

U.S. PATENT DOCUMENTS 6,611,622 B1* 8/2003 Krumm .............. G06K 9/00228
382/165
6,699,635 B1 3/2004 Kodama et al.
(Continued)

FOREIGN PATENT DOCUMENTS

JP 2000-187329 A 7/2000
JP 2006-065447 A 3/2006
(Continued)

OTHER PUBLICATIONS

Noriji Kato et al., "Automatic Image Annotation with Probabilistic Generative Models", Fuji Xerox Technical Report, Feb. 20, 2013, No. 22 2013, pp. 1-10, Japan.
(Continued)

*Primary Examiner* — Nay A Maung
*Assistant Examiner* — Jose M Torres
(74) *Attorney, Agent, or Firm* — Studebaker & Brackett PC

(57) ABSTRACT

Provided are an image discrimination apparatus, an image discrimination method, a program of the image discrimination apparatus, and a recording medium on which the program is stored, for relatively simply discriminating between "a person image" and "a non-person image" in consideration of an intention of an album maker or the like. A user sets a reference value for a reference item by adjusting a position of a slide on a slide bar. In a case where the reference value is set at a position P11, a discrimination target image I11 is discriminated as a person image, but discrimination target images I12 and I13 are discriminated as non-person images. In a case where the reference value is set at a position P12, the discrimination target images I11 and I12 are discriminated as person images, and the discrimination target image I13 is discriminated as a non-person image. By changing the setting of the reference
(Continued)

value, it is possible to discriminate between a person image and a non-person image in consideration of an intention of a user such as an album maker or the like.

26 Claims, 19 Drawing Sheets

(58) Field of Classification Search
CPC .......... G06K 9/00362; G06K 9/00624; G06V 20/00; G06V 40/161; G06V 40/172; G06V 40/10
See application file for complete search history.

(56) References Cited

U.S. PATENT DOCUMENTS

| | | | | |
|---|---|---|---|---|
| 8,923,570 | B2* | 12/2014 | Bennett | G06K 9/00503 382/305 |
| 2003/0184667 | A1 | 10/2003 | Aoyama | |
| 2005/0168779 | A1 | 8/2005 | Tsue et al. | |
| 2006/0078201 | A1* | 4/2006 | Kim | G06K 9/00288 382/181 |
| 2006/0221779 | A1* | 10/2006 | Matsushita | H04N 1/00132 369/30.01 |
| 2007/0133885 | A1* | 6/2007 | Jeong | G06K 9/00369 382/228 |
| 2007/0257993 | A1 | 11/2007 | Hara et al. | |
| 2011/0051999 | A1* | 3/2011 | Tu | G06K 9/6256 382/103 |
| 2011/0058028 | A1* | 3/2011 | Sakai | G06K 9/00342 348/77 |
| 2012/0014560 | A1* | 1/2012 | Obrador | G06K 9/00677 382/103 |
| 2013/0011049 | A1* | 1/2013 | Kimura | G06T 7/194 382/155 |
| 2013/0108169 | A1* | 5/2013 | Ptucha | G06K 9/00228 382/195 |
| 2014/0010459 | A1* | 1/2014 | Sumi | G06K 9/00221 382/195 |
| 2014/0079322 | A1 | 3/2014 | Yamaji et al. | |
| 2015/0078732 | A1* | 3/2015 | Shakib | G11B 27/034 386/278 |
| 2015/0261994 | A1* | 9/2015 | Yamaji | H04N 1/00196 382/118 |
| 2016/0277397 | A1* | 9/2016 | Watanabe | G06K 9/00906 |
| 2016/0350932 | A1* | 12/2016 | Kim | G06K 9/00228 |
| 2017/0156206 | A1* | 6/2017 | Kogawa | G06F 3/0446 |
| 2018/0167532 | A1* | 6/2018 | Obayashi | H04N 1/387 |
| 2018/0217743 | A1* | 8/2018 | Ishida | G06F 3/1201 |

FOREIGN PATENT DOCUMENTS

| | | |
|---|---|---|
| JP | 2006-268820 A | 10/2006 |
| JP | 2006-318034 A | 11/2006 |
| JP | 2007-049387 A | 2/2007 |
| JP | 2007-072861 A | 3/2007 |
| JP | 2007-264887 A | 10/2007 |
| JP | 2007-295212 A | 11/2007 |
| JP | 2008-072172 A | 3/2008 |
| JP | 2008-288684 A | 11/2008 |
| JP | 2009-223764 A | 10/2009 |
| JP | 4346859 B2 | 10/2009 |
| JP | 4455302 B2 | 4/2010 |
| JP | 2011-130328 A | 6/2011 |
| JP | 5655112 B2 | 1/2015 |

OTHER PUBLICATIONS

An Office Action; "Notice of Reasons for Refusal", mailed by the Japanese Patent Office dated Apr. 13, 2021, which corresponds to Japanese Patent Application No. 2018-047743 and is related to U.S. Appl. No. 16/351,391; with English language translation.

An Office Action; "Decision of Refusal", mailed by the Japanese Patent Office dated Dec. 7, 2021, which corresponds to Japanese Patent Application No. 2018-047743 and is related to U.S. Appl. No. 16/351,391; with English language translation.

An Office Action mailed by China National Intellectual Property Administration dated Nov. 30, 2022, which corresponds to Chinese Patent Application No. 201910195981.2 and is related to U.S. Appl. No. 16/351,391; with English language translation.

* cited by examiner

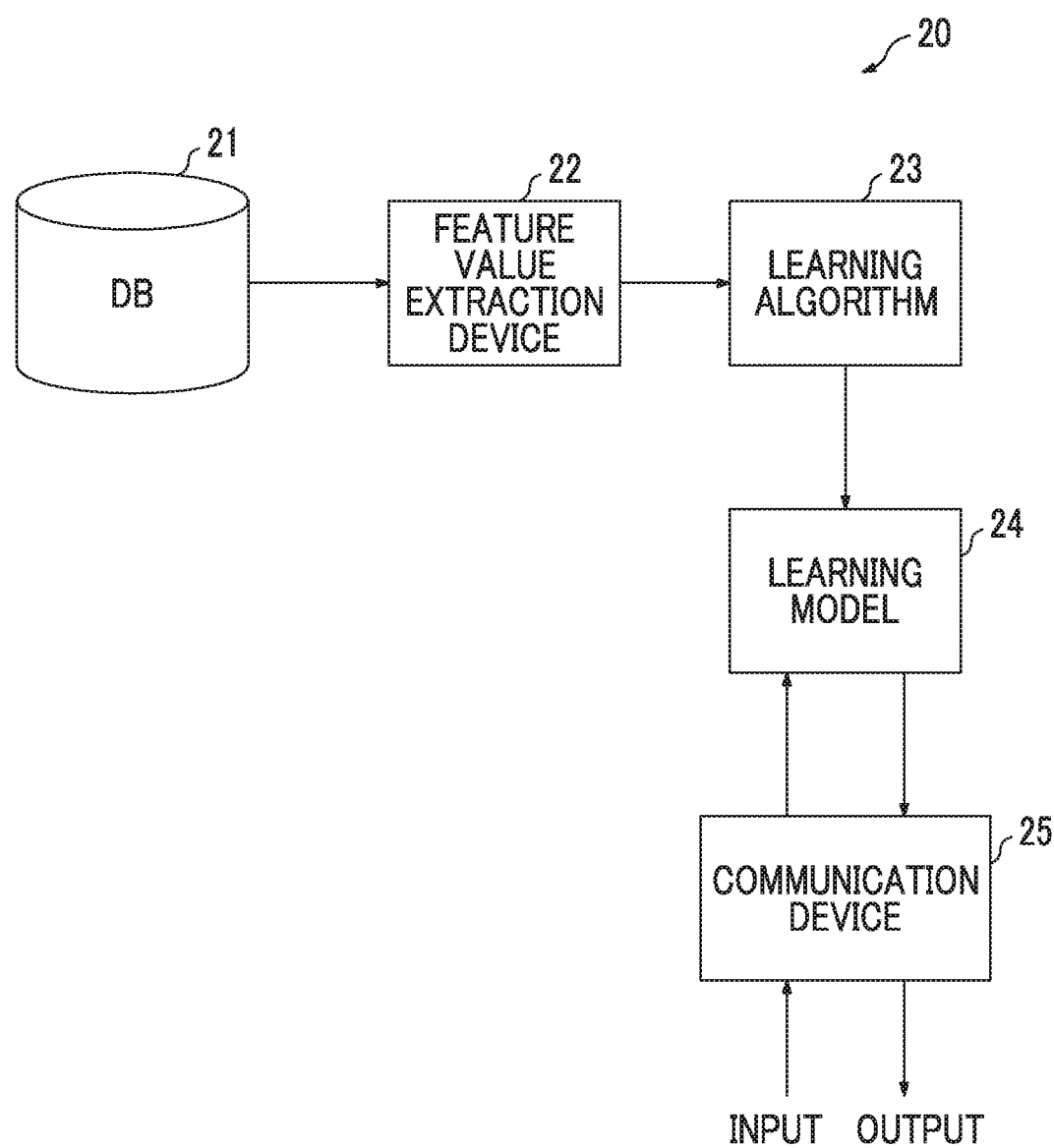

FIG. 3

 — I  — I ....................

PERSON GRADE IS 3 POINTS AT RATIO BETWEEN PERSON AND "MONO ITEM"
PERSON GRADE IS 3 POINTS AT RATIO BETWEEN PERSON AND "SCENERY"
PERSON GRADE BASED ON DIRECTION OF FACE IS 2 POINTS

PERSON GRADE IS 2 POINTS AT RATIO BETWEEN PERSON AND "MONO ITEM"
PERSON GRADE IS 1 POINT AT RATIO BETWEEN PERSON AND "SCENERY"
PERSON GRADE BASED ON DIRECTION OF FACE IS 3 POINTS

..................... 

PERSON GRADE IS 1 POINT AT RATIO BETWEEN PERSON AND "MONO ITEM"
PERSON GRADE IS 2 POINTS AT RATIO BETWEEN PERSON AND "SCENERY"
PERSON GRADE BASED ON DIRECTION OF FACE IS 3 POINTS

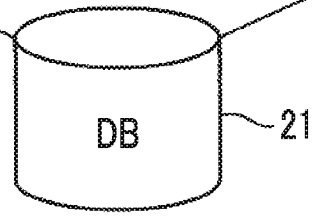
DB — 21

FIG. 14
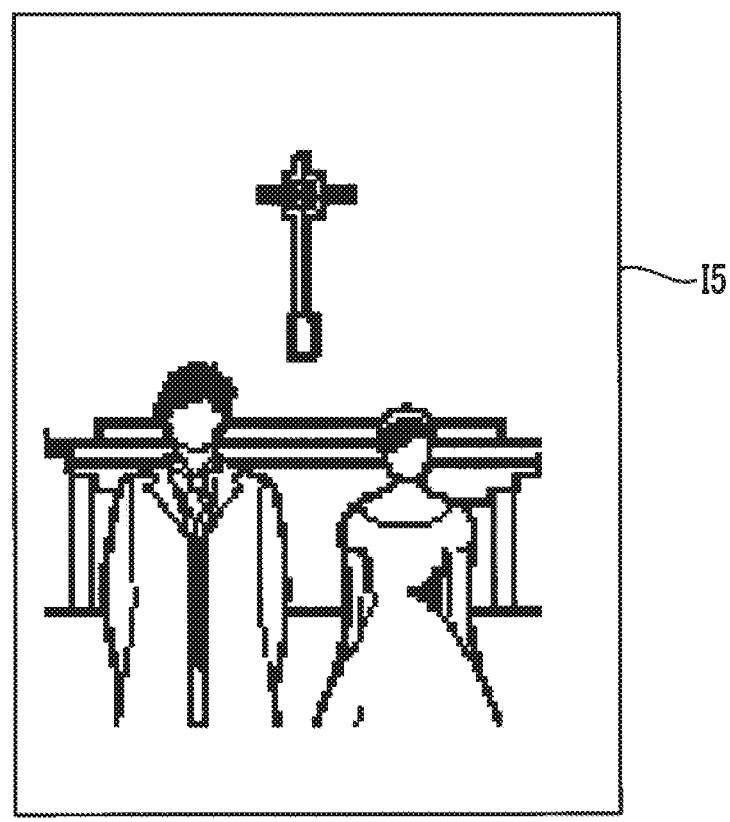
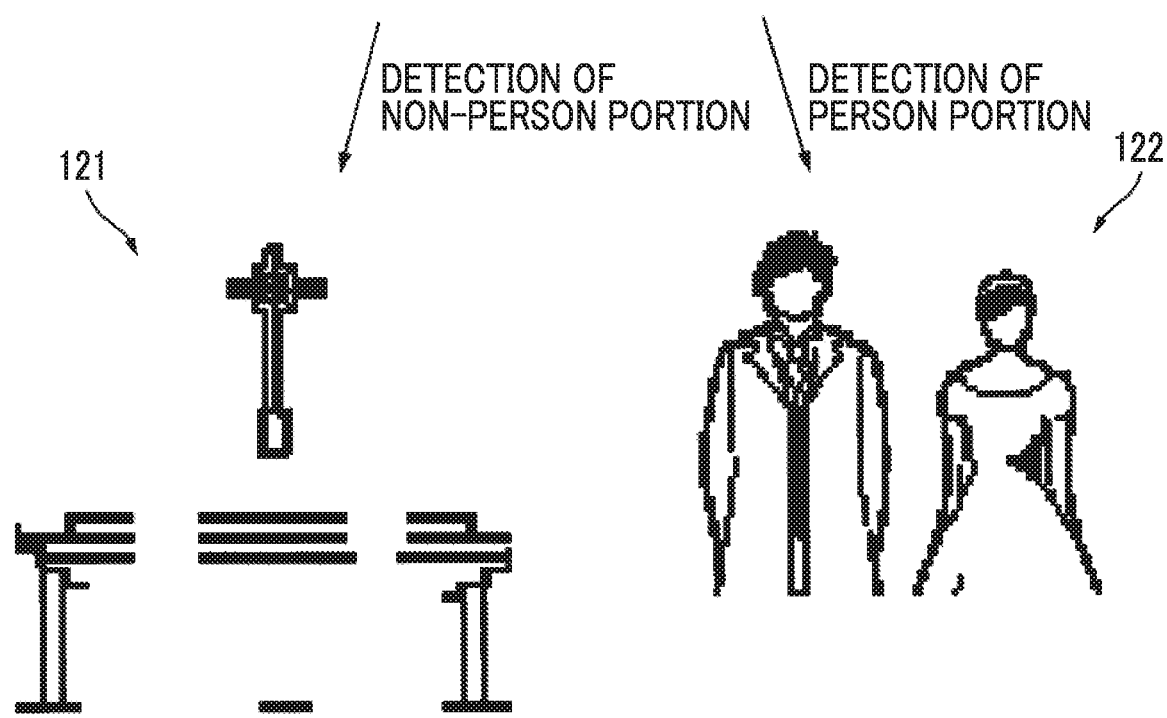

IMAGE DISCRIMINATION APPARATUS, IMAGE DISCRIMINATION METHOD, PROGRAM OF IMAGE DISCRIMINATION APPARATUS, AND RECORDING MEDIUM ON WHICH PROGRAM IS STORED

CROSS-REFERENCE TO RELATED APPLICATIONS

The present application claims priority under 35 U.S.C. § 119 to Japanese Patent Application No. 2018-047743, filed Mar. 15, 2018. Each of the above application(s) is hereby expressly incorporated by reference, in its entirety, into the present application.

BACKGROUND OF THE INVENTION

1. Field of the Invention

The present invention relates to an image discrimination apparatus, an image discrimination method, a program of the image discrimination apparatus, and a recording medium on which the program is stored.

2. Description of the Related Art

In an event such as a wedding ceremony, there is a case where a professional photographer takes photos and makes an album using the taken images. In a case where the professional photographer makes the album, the professional photographer selects images to be employed for the album while determining which images are most suitable in consideration of an intention of an imaged scene, an album story, or the like. However, in a case where multiple images of 1000 shots or more are captured in one event such as a wedding ceremony, it is not easy for an album maker to find the most suitable images from the multiple images for layout of the album. Accordingly, a method for automatically selecting and editing photos to be suitable for making an album (JP5655112B), a method for designating a state of an image to be inserted in a template of an album and inserting the designated image (JP4455302B), a method for detecting whether an image is inadequate and displaying the detection result (JP2000-187329A), a method for extracting and enlarging a specific area and determining whether its focus is right (JP4346859B), and the like have been considered.

Further, a method for assigning a scene of "person", a scene of "beach", or the like to images (JP2007-295212A), a method for detecting a face of a person (JP2006-318034A), a method for specifying an area that is a candidate of a person area (JP2007-264887A), a method for detecting a person with high accuracy (JP2008-288684A), a method for determining an image in which a person is not present as a scenery photo image, and determining an image in which a person is present as a person image, a commemorative photo image, or a portrait image in consideration of the number of persons, an area of a person, or the like (JP2008-288684A), and the like have been proposed.

SUMMARY OF THE INVENTION

In making an album, there are many cases where "non-person images" of food, a building, scenery, or the like for recalling memories are selected, in addition to "person images", for layout of the album. Particularly, in a case where a professional photographer makes an album using images taken in an event such as a wedding ceremony, it is also important to select "non-person images" effectively indicating the atmosphere of the wedding ceremony, in addition to "person images" of a bride and a groom. Since such "non-person images" are not necessarily arranged in a time series manner along the flow of the event such as the wedding ceremony, it may be difficult to select the non-person images from a large number of taken images. In this case, a method for finding out "non-person images" to be used in the album by discriminating between "person images" and "non-person images" from the large number of images may be considered. However, whether the image is a "person image" or a "non-person image" is determined according to an album maker's intention, characteristics of taken images, or the like (an angle of view intended by a photographer, or the like). Thus, there are many cases where the album maker checks multiple images one by one and determines whether each image is a "person image" or a "non-person image". For this reason, in many cases, it is difficult to simply discriminate between a "person image" and a "non-person image" in consideration of an album maker's intention.

An object of the invention is to provide a technique capable of relatively simply discriminating between a "person image" and a "non-person image" in consideration of an album maker's intention, or the like.

According to an aspect of the invention, there is provided an image discrimination apparatus comprising: a reference value setting device (reference value setting means) for setting a reference value used for a process of discriminating at least one of a person image or a non-person image in at least one reference item; and a discrimination device (discrimination means) for discriminating whether a discrimination target image is a person image or a non-person image (the non-person image is an image that is not the person image) on the basis of the reference value set by the reference value setting device.

According to another aspect of the invention, there is provided an image discrimination method suitable for the image discrimination apparatus. That is, this method comprising: setting a reference value used for a process of discriminating at least one of a person image or a non-person image in at least one reference item, using a reference value setting device (reference value setting means); and discriminating whether a discrimination target image is a person image or a non-person image on the basis of the set reference value, using a discrimination device (discrimination means).

Further, according to still another aspect of the invention, there is provided a non-transitory computer readable recording medium storing a computer-readable program for controlling a computer of the image discrimination apparatus, and a recording medium on which the program is stored.

According to still another aspect of the invention, there may be provided an image discrimination apparatus that comprises a processor that sets a reference value used for a process of discriminating at least one of a person image or a non-person image in at least one reference item and discriminates whether a discrimination target image is a person image or a non-person image on the basis of the set reference value.

For example, the discrimination device may discriminate whether the discrimination target image is the person image or the non-person image on the basis of an evaluation value indicating a person image likeness or a non-person image likeness of the discrimination target image, obtained on the basis of a plurality of sample images, and the reference value set by the reference value setting device.

For example, the reference item may be an area ratio between a person portion and a non-person portion in the discrimination target image, and the image discrimination apparatus may further comprise a detection device (detection means) for detecting the person portion and the non-person portion in the discrimination target image. In this case, for example, the discrimination device may discriminate whether the discrimination target image is the person image or the non-person image on the basis of the area ratio between the person portion and the non-person portion in the discrimination target image detected by the detection device and the reference value set by the reference value setting device.

The image discrimination apparatus may further comprise: a display control device (display control means) for changing display forms of the person portion and the non-person portion in the discrimination target image detected by the detection device to display the discrimination target image.

For example, the discrimination device may discriminate whether the discrimination target image is the person image or the non-person image on the basis of a direction of a face of a person in the discrimination target image and the reference value set by the reference value setting device.

For example, the reference item may be a ratio between a person and an object other than the person included in the discrimination target image, the reference item may be a ratio between a person and scenery included in the discrimination target image, and the reference item may be a degree indicating how much a face of a person included in the discrimination target image faces forward.

In a case where a plurality of the reference items are provided, for example, the discrimination device may perform the discrimination of the discrimination target image for each reference value in each of the reference items set by a plurality of the reference value setting device, and may output a discrimination result for each reference value.

The discrimination device may discriminate whether the discrimination target image is the person image or the non-person image on the basis of the discrimination results for the plurality of reference items.

The image discrimination apparatus may further comprise: a notification device (notification means) for notifying a discrimination result in the discrimination device; and a notification control device (notification control means) for changing a notification form in the notification device as the discrimination result in the discrimination device is changed according to change in a setting of the reference value in the reference value setting device.

The image discrimination apparatus may further comprise a employability determination device (employability determination means) for determining whether the discrimination target image is employable on the basis of a discrimination result in the discrimination device.

The image discrimination apparatus may further comprise: a positioning device (positioning means) for determining a paste position in an album with respect to the discrimination target image determined to be employable by the employability determination device on the basis of the discrimination result in the discrimination device.

According to the invention, by changing a reference value in accordance with a user's intention, even in the case of the same discrimination target images, the image may be discriminated as a person image or a non-person image on the basis of the user's intention. Thus, it is possible to discriminate whether a discrimination target image is a person image or a non-person image in consideration of an intention of a user such as an album maker.

BRIEF DESCRIPTION OF THE DRAWINGS

FIG. 2 is a diagram showing an example of a block diagram showing an electric configuration of an artificial intelligence device.

FIG. 3 is a diagram showing an example of a sample image stored in a database.

FIG. 14 is a diagram showing detection of a non-person portion and a person portion.

DESCRIPTION OF THE PREFERRED EMBODIMENTS

First Embodiment

Figure 1:
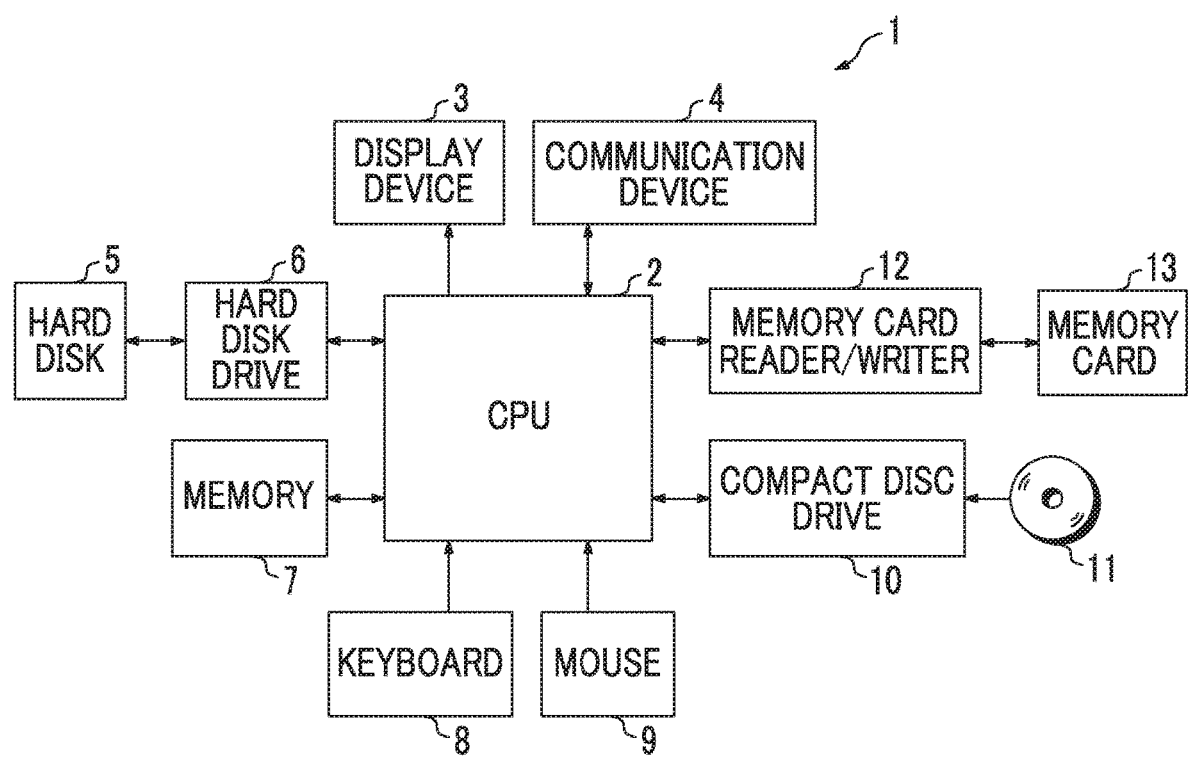
FIG. 1 is a block diagram showing an electric configuration of an image discrimination apparatus.

FIG. 1 shows an embodiment of the invention, which is a block diagram showing an electric configuration of an image discrimination apparatus 1.

An overall operation of the image discrimination apparatus 1 is generally controlled by a central processing unit (CPU) 2.

The image discrimination apparatus 1 includes a display device 3 that displays information such as an image or the like on a display screen, and a communication device 4 that is connected to a network such as the Internet or the like and communicates with a device other than the image discrimination apparatus 1. Further, the image discrimination apparatus 1 also includes a hard disk 5, a hard disk drive 6 that accesses the hard disk 5, a memory 7 that stores data or the like, and a keyboard 8 and a mouse 9 for inputting a command or the like. In addition, the image discrimination apparatus 1 also includes a compact disc drive 10 that accesses a compact disc 11, and a memory card reader/writer 12 that performs writing of data on a memory card 13 and reading-out of data recorded on the memory card 13.

An operating program of the image discrimination apparatus 1 to be described hereinafter is received in the communication device 4 through the Internet. The received operating program is installed in the image discrimination apparatus 1. The operating program may be recorded on a portable recording medium such as the compact disc 11 and may be read out from the portable recording medium, instead of being received by the image discrimination apparatus 1 through the network such as the Internet and being installed in the image discrimination apparatus 1. In this case, the operating program read-out from the portable recording medium is installed in the image discrimination apparatus 1. The operating program may be read out by the CPU 2 (computer) of the image discrimination apparatus 1.

FIG. 2 is a block diagram showing an electric configuration of an artificial intelligence device 20 capable of communicating with the image discrimination apparatus 1. In FIG. 2, the artificial intelligence device 20 is configured of hardware, but a part thereof may be configured of software.

The artificial intelligence device 20 includes a database 21.

FIG. 3 shows sample images I indicated by multiple image files stored in the database 21.

Each sample image I is assigned a score indicating a person grade in advance for each reference item. In this embodiment, a score of a person grade (for example, the score becomes higher as a proportion of the person becomes larger) based on a ratio between a person and a "object item" (which is an example of a non-person portion) in the sample image I, a score of a person grade (for example, the score becomes higher as a proportion of the person becomes larger) based on a ratio between a person (a person portion) and "scenery" (which is an example of a non-person portion) in the sample image I, and a score of a person grade (for example, the score becomes higher as a direction of a face of a person faces forward) based on the direction of the face of the person in the sample image I are assigned to each sample image I. Data indicating the scores is stored in a header of an image file indicating each sample image I, for example. Since the person grade represents an index or a degree indicating that each sample image I is a person image, and an evaluation value of a person image likeness, as the score becomes higher (for example, 3 points are set to be a full mark, but different points may be used), the sample image I shows a higher person image likeness. In a case where the score of the person grade is low, the sample image I shows a non-person image likeness. Data indicating a score of a non-person grade (an index indicating that the sample image I is the non-person image, a degree, an evaluation value of the non-person image likeness), instead of the data indicating the score of the person grade, may be stored in the header of the image file indicating the sample image I, or the data indicating the score of the person grade and the data indicating the score of the non-person grade may be respectively stored in the header of the image file indicating the sample image I. The score of the person grade or the non-person grade may be assigned by a user while viewing the image.

Referring to FIG. 2, multiple image files stored in the database 21 are read out, and data indicating feature values of images is extracted by a feature value extraction device 22. A learning model 24 is generated in accordance with a learning algorithm 23 using the data indicating the extracted feature values.

Image data is transmitted from the communication device 4 of the image discrimination apparatus 1, and is input through a communication device 25 of the artificial intelligence device 20. With respect to the input image data, in the learning model 24, a score (which is an example of an evaluation value indicating a person image likeness) of a person grade of an image indicated by the image data (in which the score may be a score of a non-person grade, which is an example of an evaluation value indicating a non-person image likeness) is calculated. The data indicating the calculated score is transmitted to the image discrimination apparatus 1 through the communication device 25.

In a case where the data indicating the score transmitted from the artificial intelligence device 20 is received in the image discrimination apparatus 1, the CPU 2 discriminates whether the image indicated by the image data transmitted from the image discrimination apparatus 1 is a person image or a non-person image, on the basis of the score.

The artificial intelligence device 20 shown in FIG. 2 is a device different from the image discrimination apparatus 1 shown in FIG. 1, but may be connected to the image discrimination apparatus 1 shown in FIG. 1.

Figure 4:
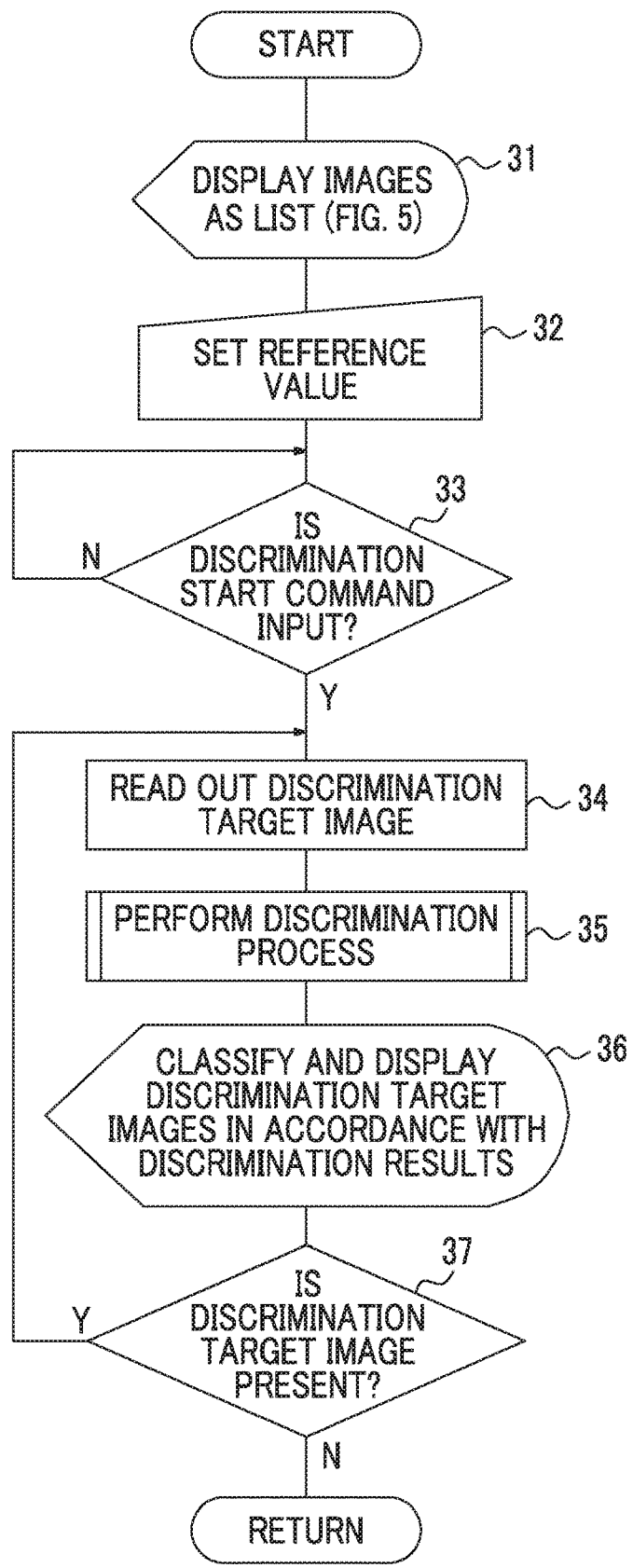
FIG. 4 is a flowchart showing a processing procedure of the image discrimination apparatus.

FIG. 4 shows an example of a flowchart showing a processing procedure of the image discrimination apparatus 1.

As a command such as an image discrimination start command is given to the image discrimination apparatus 1 through the keyboard 8 or the like, the process shown in FIG. 4 is started.

It is assumed that image files indicating multiple images that are targets of the discrimination of whether the images are person images or non-person images are stored in the memory card 13. The image files indicating the multiple images that are the targets of the discrimination of whether the images are the person images or the non-person images may be stored in a recording medium other than the memory card 13, such as the compact disc 11, the hard disk 5, or the like.

The multiple image files stored in the memory card 13 are read out by the memory card reader/writer 12, and the multiple images are displayed on a display screen of the display device 3 as a list (step 31).

Figure 5:
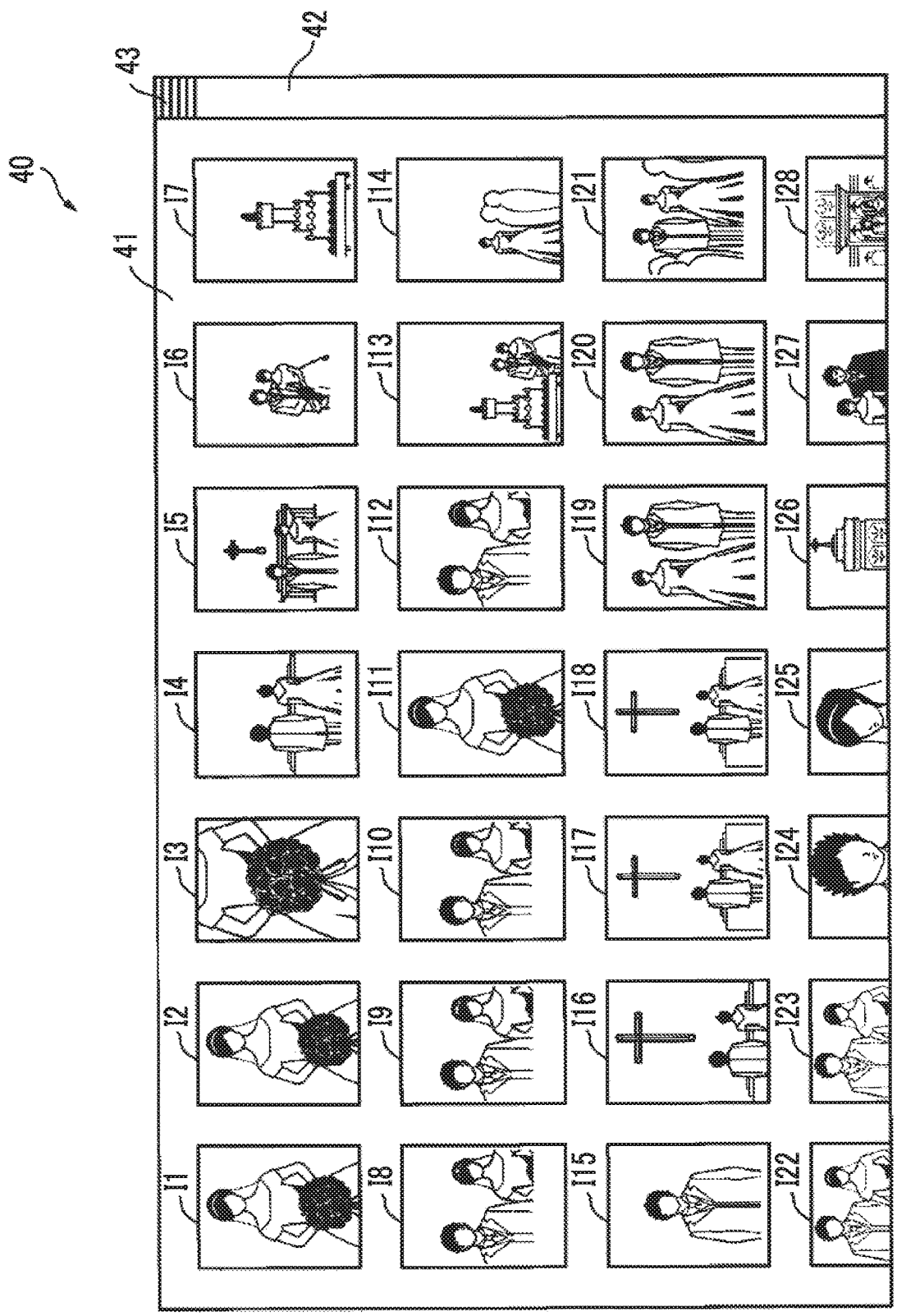
FIG. 5 is a diagram showing an example of an image display window.

FIG. 5 is a diagram showing an example of an image display window 40.

The image display window 40 is displayed on the display screen of the display device 3. An image display area 41 is formed on the image display window 40. Multiple discrimination target images I1 to I28 indicated by the multiple image files stored in the memory card 13 are displayed in the image display area 41. A scroll bar 42 is formed on a right side of the image display area 41. A knob 43 is formed in the scroll bar 42. The knob 43 is movable up and down, and as a user moves the knob 43 up and down, images that are not displayed in the image display area 41 are displayed in the image display area 41.

Subsequently, the user sets a reference value (step 32 in FIG. 4).

Figure 6:
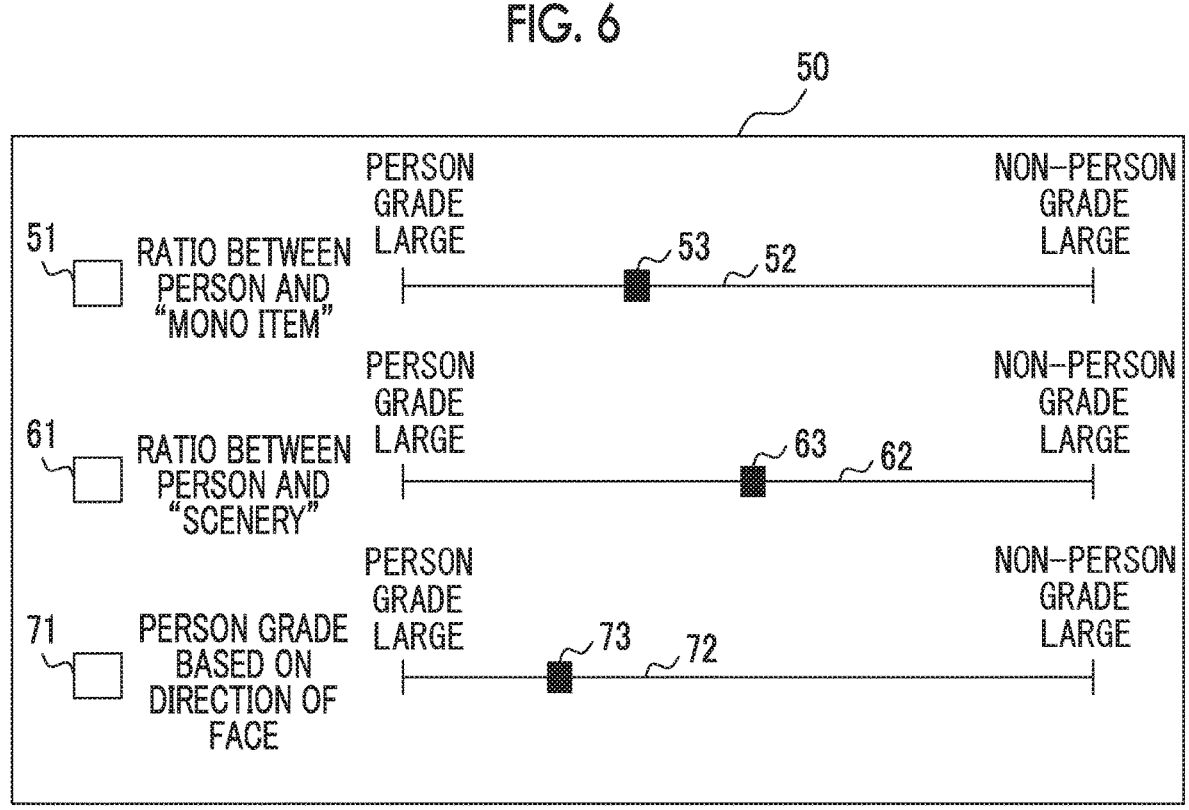
FIG. 6 is a diagram showing an example of a reference value setting window.

FIG. 6 is a diagram showing an example of a reference value setting window 50.

The reference value setting window 50 shown in FIG. 6 is also displayed on the display screen of the display device 3.

In this embodiment, a reference value (threshold value) to be used in a process for discriminating whether an image is a person image or a non-person image may be set by the user with respect to a certain reference item among a plurality of reference items. For example, as described above with reference to FIG. 2, in a case where a score that is calculated in the artificial intelligence device 20 and is transmitted to the image discrimination apparatus 1 from the artificial intelligence device 20 is equal to or greater than the reference value, it is discriminated by the image discrimination apparatus 1 that an image of the score is a non-person image (or a person image). Since the user can set the reference value, it is possible to discriminate whether an image is a non-person image or a person image on the basis of the reference value set by the user. Thus, it is possible to discriminate whether the image is the non-person image or the person image in consideration of a user's intention or the like.

On the reference value setting window 50, a first checkbox 51, a second checkbox 61, and a third checkbox 71 are formed.

On a right side of the first checkbox 51, a character string of "a ratio between a person and an object item" and a first slide bar 52 disposed in a lateral direction (an example of a reference value setting device) are displayed. A first slider 53 that is movable in the lateral direction is formed in the first slide bar 52. A first reference item corresponds to "the ratio between the person and the object item". A reference value of the first reference item is set in accordance with a position of the first slider 53 in the first slide bar 52. As the position of the first slider 53 is closer to a left side, a score of a person likeness of an image that is a discrimination target becomes higher (the proportion of the person is large compared with the object item included in the image that is the discrimination target), and in this case, it is determined that the image is a person image. Further, as the position of the first slider 53 is closer to a right side, it is determined that the image is a person image even in a case where the proportion of the person included in the image that is the discrimination target is small. The ratio between the person and the "object item" represents a ratio between a person portion included in a discrimination target image and a stuff, an item (product), or the like held by the person, in which a background portion for the person, such as scenery, is excluded. In a case where a stuff or the like is included in the background portion for the person, the stuff or the like is ignored, but instead, a stuff included in the discrimination target image may be detected, and a ratio between the person and the stuff may be calculated.

Figure 7:
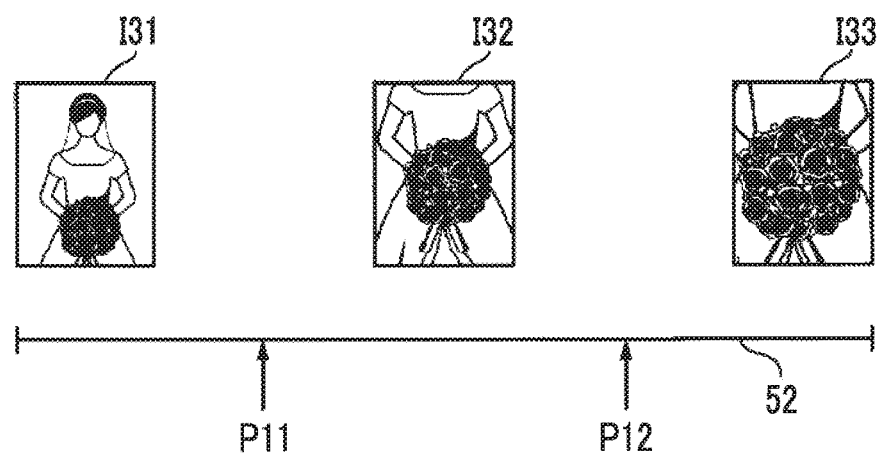
FIG. 7 shows a relationship between a discrimination target image and a slide bar.

FIG. 7 shows a case where it is determined whether an image that is a discrimination target is a person image or a non-person image on the basis of a ratio between a person and a "object item".

A discrimination target image I31 shows that the proportion of a stuff (bouquet) is small compared with the size of a person, and thus, a score of a person grade of the discrimination target image I31 is 3 points. Further, a discrimination target image I32 shows that the proportion of the stuff (bouquet) is relatively large compared with the size of the person, and thus, a score of a person grade of the discrimination target image I32 is 2 points. Further, a discrimination target image I33 shows that the proportion of the stuff (bouquet) is large compared with the size of the person, and thus, a score of the discrimination target image I33 is 1 point.

In the above-described cases, for example, in a case where a setting is performed so that the first slider 53 is positioned at a position P11 of the first slide bar 52, and so that an image having a score of 2.5 points or higher is discriminated as a person image and an image having a score smaller than 2.5 points is discriminated as a non-person image, the discrimination target image I31 is discriminated as the person image, but the discrimination target image I32 and the discrimination target image I33 are discriminated as the non-person images. However, in a case where a setting is performed so that the first slider 53 is positioned at a position P12 of the first slide bar 52, and so that an image having a score of 1.5 points or higher is discriminated as a person image and an image having a score smaller than 1.5 points is discriminated as a non-person image, the discrimination target image I31 and the discrimination target image I32 are discriminated as the person images, and the discrimination target image I33 is discriminated as the non-person image. In this way, it is possible to cause the discrimination target image I32 to be determined as a person image or a non-person image in accordance with a user's intention (in accordance with the position of the first slider 53). It is preferable to display sample images such as the discrimination target images I31 to I33 shown in FIG. 7 in association with the first slide bar 52, and to understand whether a certain image is discriminated as a person image or a non-person image in accordance with the position of the first slider 53. Further, a configuration in which a plurality of sample images are displayed, a user designates the sample images as person images or non-person images, and a reference value is determined on the basis of a score of a person image likeness or a score of a non-person image likeness of each designated person image or non-person image may be used.

Returning to FIG. 6, on a right side of the second checkbox 61, a character string of "a ratio between a person and scenery" and a second slide bar 62 disposed in the lateral direction (an example of a reference value setting device) are displayed. A second slider 63 that is movable in the lateral direction is formed in the second slide bar 62. A second reference item is "the ratio between the person and the scenery". A reference value of the second reference item is set in accordance with the position of the second slider 63 in the second slide bar 62. As the position of the second slider 63 is closer to a left side, a score of a person likeness of an image that is a discrimination target becomes higher (the proportion of the person is large compared with the scenery included in the image that is the discrimination target), and in this case, it is determined that the image is a person image. Further, as the position of the second slider 63 is closer to a right side, it is determined that the image is a person image even in a case where the proportion of the person included in the image that is the discrimination target is small. The ratio between the person and the "scenery" represents a ratio between a person portion and scenery (background) included in a discrimination target image. In a case where the scenery (background) surrounds a person, the scenery (background) may be recognized as a portion other than the surrounded area. Even in a case where the person included in the discrimination target image carries a stuff such as a bouquet, the stuff is ignored. The stuff that is present in the scenery (background) is a part of the scenery, but a configuration in which the stuff included in the discrimination target image is detected and the ratio is calculated using the scenery (background) excluding the detected stuff may be used.

In the above-described embodiment, the scenery (background) and a stuff are distinguished from each other, but a configuration in which a person portion and a non-person portion (portion other than the person) included in a target image are detected without distinguishing between the scenery (background) and the stuff and a reference value is set by using a ratio between the person portion and the non-person portion as a reference item may be used.

Figure 8:
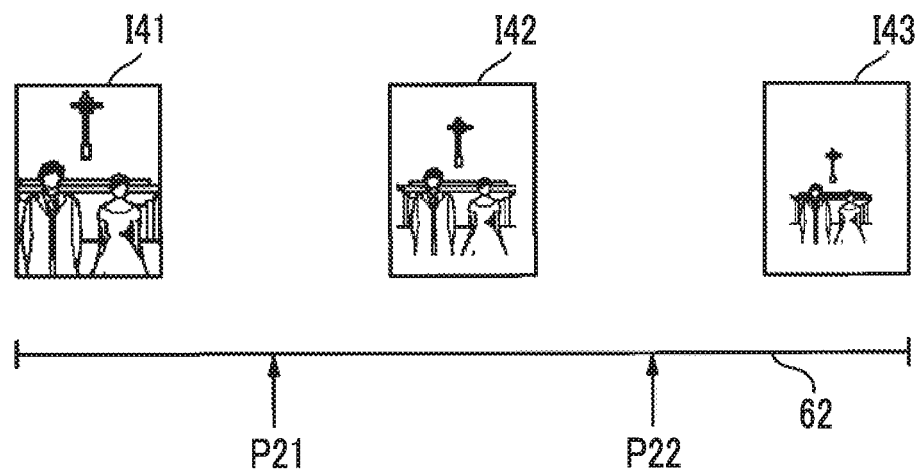
FIG. 8 shows a relationship between a discrimination target image and a slide bar.

FIG. 8 shows a case where it is determined whether an image that is a discrimination target is a person image or a non-person image on the basis of a ratio between a person and "scenery".

A discrimination target image I41 shows that the proportion of scenery (background) is small compared with the size of a person, and thus, a score of a person grade of the discrimination target image I41 is 3 points. Further, a discrimination target image I42 shows that the proportion of the scenery is relatively large compared with the size of the person, and thus, a score of a person grade of the discrimination target image I42 is 2 points. Further, a discrimination target image I43 shows that the proportion of the scenery is large compared with the size of the person, and thus, a score of the discrimination target image I43 is 1 point.

In the above-described cases, for example, in a case where a setting is performed so that the second slider 63 is positioned at a position P21 of the second slide bar 62, and so that an image having a score of 2.5 points or higher is discriminated as a person image and an image having a score smaller than 2.5 points is discriminated as a non-person image, the discrimination target image I41 is discriminated as the person image, but the discrimination target image I42 and the discrimination target image I43 are discriminated as the non-person images. However, in a case where a setting is performed so that the second slider 63 is positioned at a position P22 of the second slide bar 62, and so that an image having a score of 1.5 points or higher is discriminated as a person image and an image having a score smaller than 1.5 points is discriminated as a non-person image, the discrimination target image I41 and the discrimination target image I42 are discriminated as the person images, and the discrimination target image I43 is discriminated as the non-person image. In this way, it is possible to cause the discrimination target image I42 to be determined as a person image or a non-person image in accordance with a user's intention (in accordance with the position of the second slider 63). It is preferable to display sample images such as the discrimination target images I41 to I43 shown in FIG. 8 in association with the second slide bar 62, and to understand whether a certain image is discriminated as a person image or a non-person image in accordance with the position of the second slider 63. Further, a configuration in which a plurality of sample images are displayed, a user designates the sample images as person images or non-person images, and a reference value is determined on the basis of a score of a person image likeness or a score of a non-person image likeness of each designated person image or non-person image may be used.

Returning to FIG. 6, on a right side of the third checkbox 71, a character string of "a person grade based on the direction of the face" and a third slide bar 72 disposed in the lateral direction (an example of a reference value setting device) are displayed. A third slider 73 that is movable in the lateral direction is formed in the third slide bar 72. A third reference item is "the person grade based on the direction of the face". A reference value of the third reference item is set in accordance with the position of the third slider 73 in the third slide bar 72. As the position of the third slider 73 is closer to a left side, a score of a person likeness of an image that is a discrimination target becomes higher (the proportion of the person is large compared with scenery included in the image that is the discrimination target), and in this case, it is determined that the image is a person image. Further, as the position of the third slider 73 is closer to a right side, it is determined that the image is a person image even in a case where the proportion of the person included in the image that is the discrimination target is small.

Figure 9:
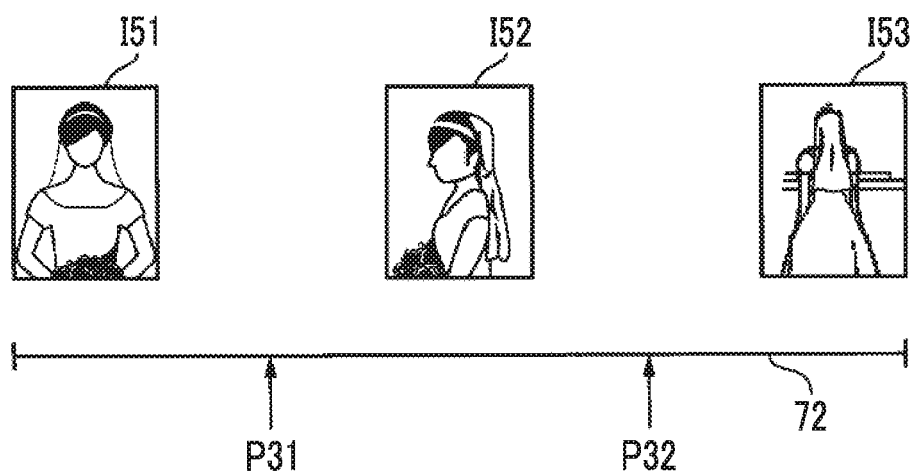
FIG. 9 shows a relationship between a discrimination target image and a slide bar.

FIG. 9 is a diagram showing a case where it is determined whether an image that is a discrimination target is a person image or a non-person image on the basis of a person grade based on the direction of the face.

A discrimination target image I51 shows that the proportion of a face of a person faces forward is large, and thus, a score of a person grade of the discrimination target image I51 is 3 points. Further, a discrimination target image I52 shows that the proportion indicating that the face of the person faces forward is relatively small, and thus, a score of a person grade of the discrimination target image I52 is 2 points. Further, a discrimination target image I53 shows that the face of the person does not face forward, and thus, a score of the discrimination target image I53 is 1 point.

In the above-described cases, for example, in a case where a setting is performed so that the third slider 73 is positioned at a position P31 of the third slide bar 72, and so that an image having a score of 2.5 points or higher is discriminated as a person image and an image having a score smaller than 2.5 points is discriminated as a non-person image, the discrimination target image I51 is discriminated as the person image, but the discrimination target image I52 and the discrimination target image I53 are discriminated as the non-person images. However, in a case where a setting is performed so that the third slider 73 is positioned at a position P32 of the third slide bar 72, and so that an image having a score of 1.5 points or higher is discriminated as a person image and an image having a score smaller than 1.5 points is discriminated as a non-person image, the discrimination target image I51 and the discrimination target image I52 are discriminated as the person images, and the discrimination target image I53 is discriminated as the non-person image. In this way, it is possible to cause the discrimination target image I52 to be determined as a person image or a non-person image in accordance with a user's intention (in accordance with the position of the third slider 73). It is preferable to display sample images such as the discrimination target images I51 to I53 shown in FIG. 9 in association with the third slide bar 72, and to understand whether a certain image is discriminated as a person image or a non-person image in accordance with the position of the third slider 73. Further, a configuration in which a plurality of sample images are displayed, a user designates the sample images as person images or non-person images, and a reference value is determined on the basis of a score of a person image likeness or a score of a non-person image likeness of each designated person image or non-person image may be used.

Referring to FIG. 6, in a case where one checkbox among the first checkbox 51, the second checkbox 61, and the third checkbox 71 is checked (as described later, a plurality of checkboxes may also be checked), a position of the first slider 53, the second slider 63, or the third slider 73 of the first slide bar 52, the second slide bar 62, or the third slide bar 72 formed in association with the checked checkbox is set as a reference value.

After the reference value is set, in a case where a discrimination start command is input to the image discrimination apparatus 1 through the keyboard 8, or the like (YES in step 33 shown in FIG. 4), image data indicating a first discrimination target image is read out from the memory card 13 (step 34 in FIG. 4). A process of discriminating whether an image indicated by the read-out image data is a person image or a non-person image is performed by the CPU 2 (an example of a discrimination device) on the basis of the set reference value (step 35 in FIG. 4). This discrimination process will be described later. Instead of the process of discriminating whether the discrimination target image is the person image or the non-person image, a process of discriminating whether or not a discrimination target image is a person image may be performed, and in a case where the discrimination target image is not discriminated as the person image, the discrimination target image may be discriminated as a non-person image. Alternatively, a process of discriminating whether or not a discrimination target image is a non-person image may be performed, and in a case where the discrimination target image is not discriminated as the non-person image, the discrimination target image may be discriminated as a person image. In accordance with the discrimination results, the discrimination target images are classified and displayed (step 36 in FIG. 4).

Figure 10:
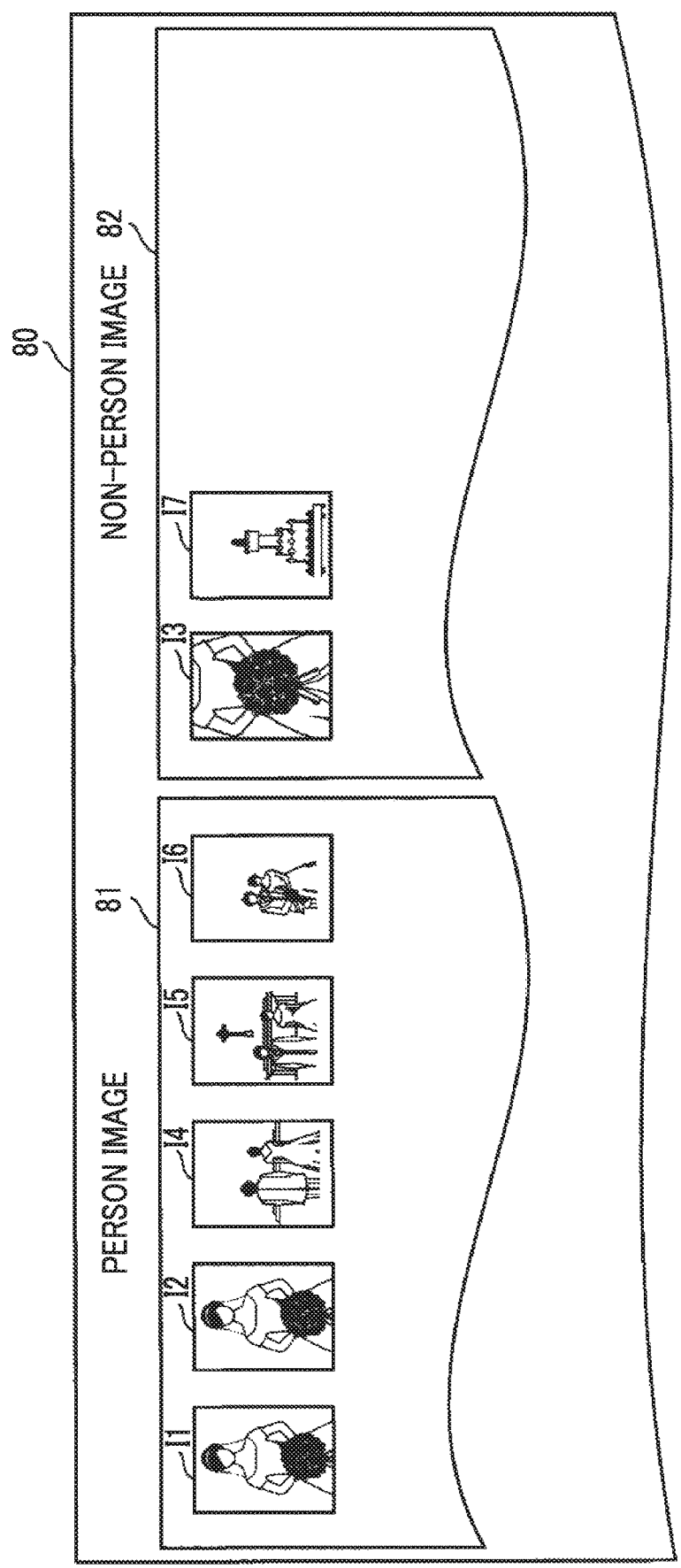
FIG. 10 is a diagram showing an example of an image classification window.

FIG. 10 is a diagram showing an example of an image classification window 80. The image classification window 80 is also displayed on the display screen of the display device 3 of the image discrimination apparatus 1.

The image classification window 80 includes a person image window 81 and a non-person image window 82. On the person image window 81, discrimination target images I1, I2, and I4 to I6 that are discriminated as person images among discrimination target images are displayed. On the non-person image window 82, discrimination target images I3 and 17 that are discriminated as non-person images among the discrimination target images are displayed. A user recognizes that the images displayed on the person image window 81 are person images, and recognizes that the images displayed on the non-person image window 82 are non-person images.

Subsequently, in a case where the next discrimination target image is present (YES in step 37 shown in FIG. 4), processes of step 34 to step 36 are repeated, and image data indicating the next discrimination target image is read out from the memory card 13 (step 34 shown in FIG. 4).

Figure 11:
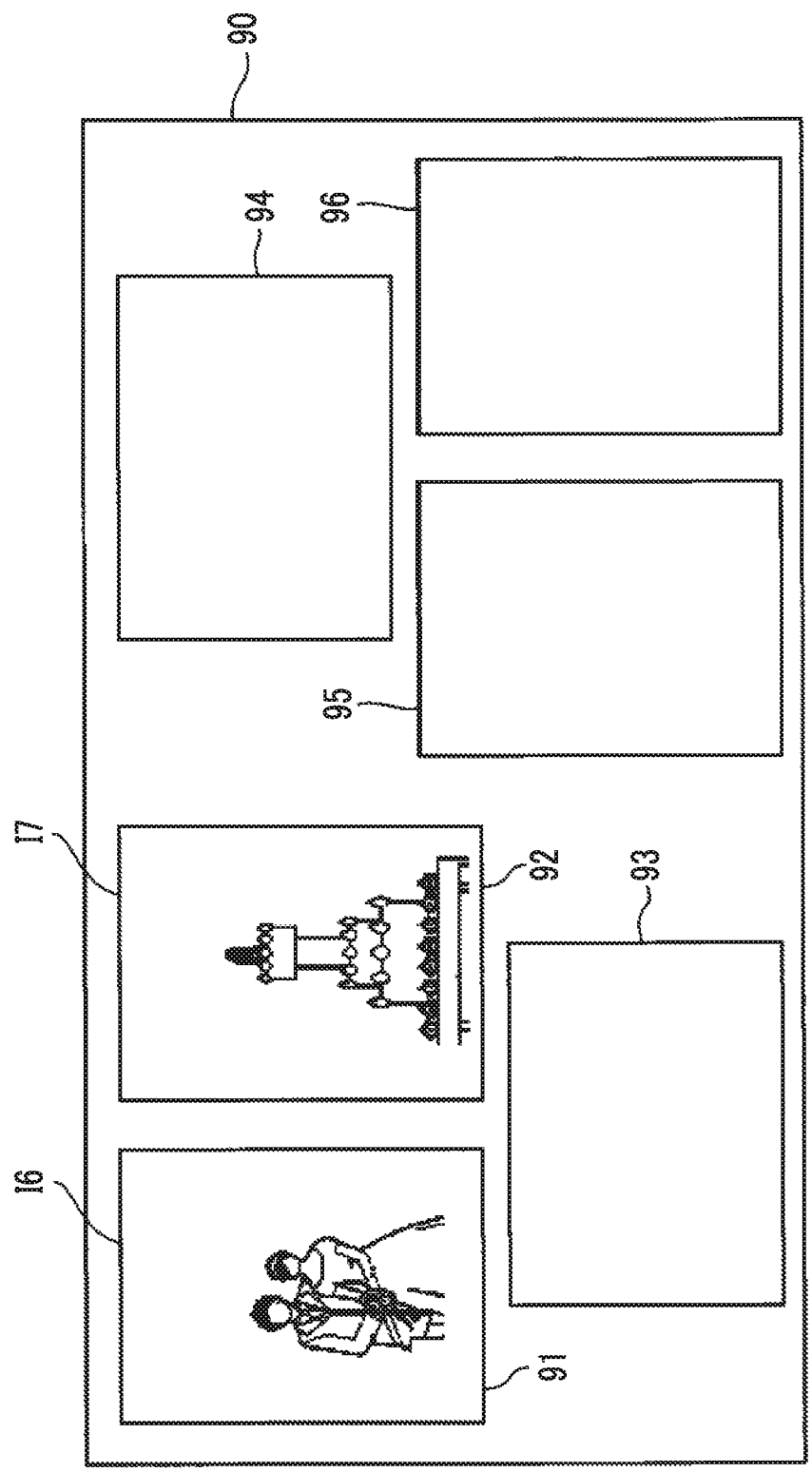
FIG. 11 is a diagram showing an example of a double-spread page of an album.

FIG. 11 is a diagram showing an example of a double-spread page of an album.

A double-spread page 90 that forms the album shown in FIG. 11 is also displayed on the display screen of the display device 3 of the image discrimination apparatus 1, but may be displayed on a display screen of a display device other than the image discrimination apparatus 1. The album includes pages other than the double-spread page 90, but in FIG. 11, only the double-spread page 90 is shown.

On the double-spread page 90 of the album, a plurality of image insertion areas 91 to 96 are formed. A user arranges person images and non-person images in the image insertion areas 91 to 96 in consideration of an album story. For example, a discrimination target image I6 of a groom and a bride before cake cutting is inserted in the image insertion area 91, and a discrimination target image I7 of cake is inserted in the image insertion area 92. Then, for example, in a case where there is an image of a cake cutting scene, the image is inserted in the image insertion area 93. Person images and non-person images may not be arranged by the user, but instead, may be automatically arranged.

Figure 12:
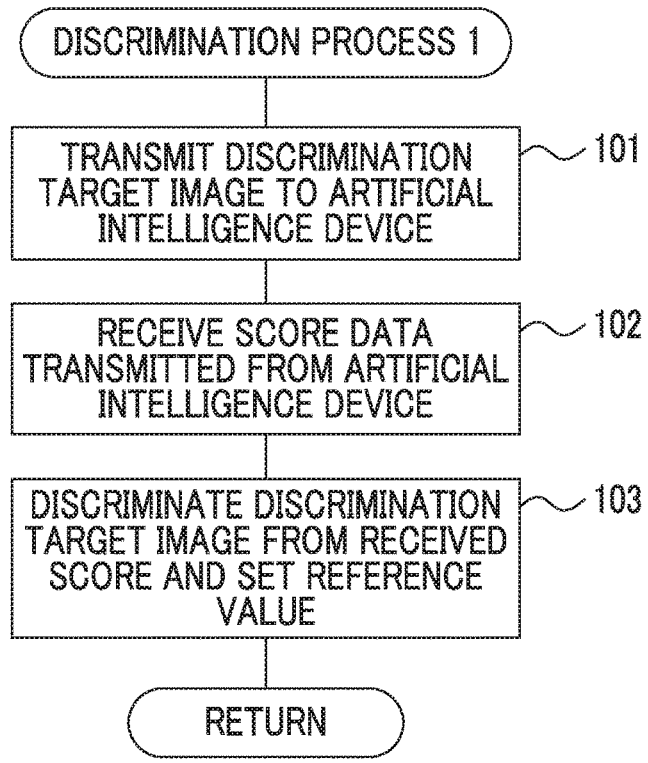
FIG. 12 is a flowchart showing a discrimination processing procedure.

FIG. 12 is a flowchart showing a first discrimination processing procedure (a processing procedure of step 36 in FIG. 4).

A first discrimination processing procedure uses the artificial intelligence device 20 as described above.

Image data indicating a discrimination target image read out from the memory card 13 and data indicating a reference item selected from the first checkbox 51, the second checkbox 61, and the third checkbox 71 are transmitted to the artificial intelligence device 20 from the image discrimination apparatus 1 (step 101). In the artificial intelligence device 20, a score indicating a person image likeness of the discrimination target image in each reference item is calculated using a score assigned to an image stored in the database 21 in accordance with the selected reference item (an example of a sample image) for each reference item. Data indicating the calculated score (an evaluation value of the person image likeness) is transmitted to the image discrimination apparatus 1 from the artificial intelligence device 20. The data indicating the score transmitted from the artificial intelligence device 20 is received through the communication device 4 of the image discrimination apparatus 1 (step 102).

It is discriminated whether the discrimination target image is a person image or a non-person image on the basis of the received data indicating the score and the reference value of the reference item set by the user (step 103). For example, the CPU 2 discriminates that the discrimination target image is the person image in a case where the score indicated by the received data is equal to or greater than the set reference value, and discriminates that the discrimination target image is the non-person image in a case where the score is smaller than the reference value.

Figure 13:
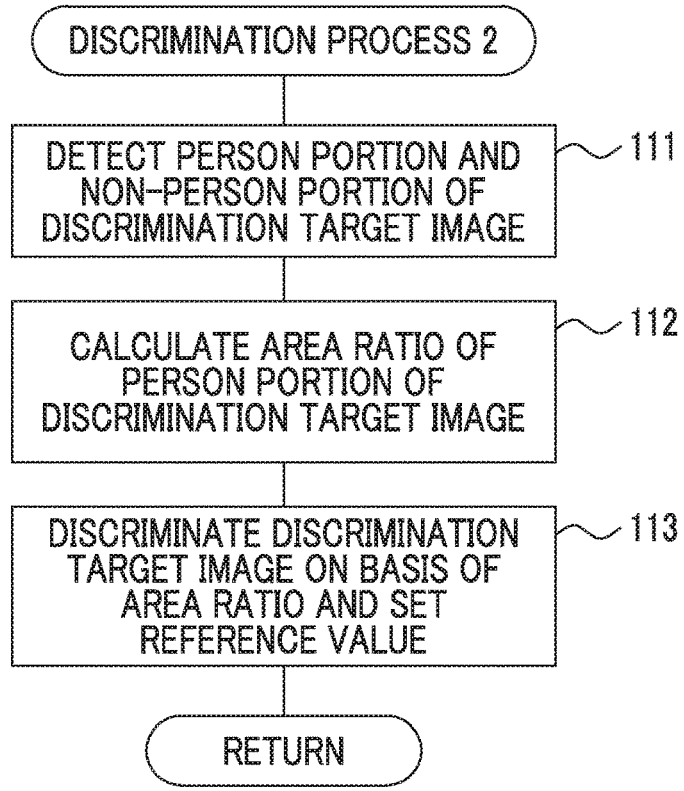
FIG. 13 is a flowchart showing another discrimination processing procedure.

FIG. 13 is a flowchart showing a second discrimination processing procedure (a processing procedure of step 35 shown in FIG. 4).

The processing procedure shown in FIG. 13 is performed in a case where a first reference item or a second reference item are set.

A person portion and a non-person portion of the discrimination target image are detected by the CPU 2 of the image discrimination apparatus 1 (a detection device) (step 111). In a case where the first reference item is set as described above, an "object item" portion is detected as the non-person portion, and in a case where the second reference item is set, a "scenery" portion (a background portion) is detected as the non-person portion.

For example, as shown in FIG. 14, in a case where the discrimination target image is the discrimination target image I5 and the second reference item is set, a "scenery" portion (background portion) 121 is detected as the non-person portion, and the person portion 122 is detected.

Returning to FIG. 13, an area ratio between the non-person portion 121 and the person portion 122 is calculated (step 112). It is discriminated whether the discrimination target image is the person image or the non-person image on the basis of the calculated area ratio and the set reference value (step 113). For example, the large person grade on the left end of the second slide bar 62 of the second reference item is set so that the area ratio between "the person portion" and "the non-person portion" is 1:2 and the large non-person grade on the right end of the second slide bar 62 of the second reference item is set so that the area ratio between "the person portion" and "the non-person portion" is 1:10

(or so that only the non-person portion is present). In a case where the calculated area ratio corresponds to a left position with reference the ratio between "the person portion" and "the non-person portion" determined at the position of the second slider 63, the discrimination target image is discriminated as the person image, and in a case where the calculated area ratio corresponds to a right position, the discrimination target image is discriminated as the non-person image. For example, in a case where the second slider 63 is positioned at the center of the second slide bar 62 and the area ratio between "the person portion" and "the non-person portion" of the central position shows 1:6, it is determined that the discrimination target image is the person image in a case where the area ratio of the discrimination target image is larger than 1:6 in the person portion, and it is determined that the discrimination target image is the non-person image in a case where the area ratio of the discrimination target image is larger than 1:6 in the non-person portion. This is similarly applied to a case where the first reference item is set, instead of the second reference item.

Figure 15:
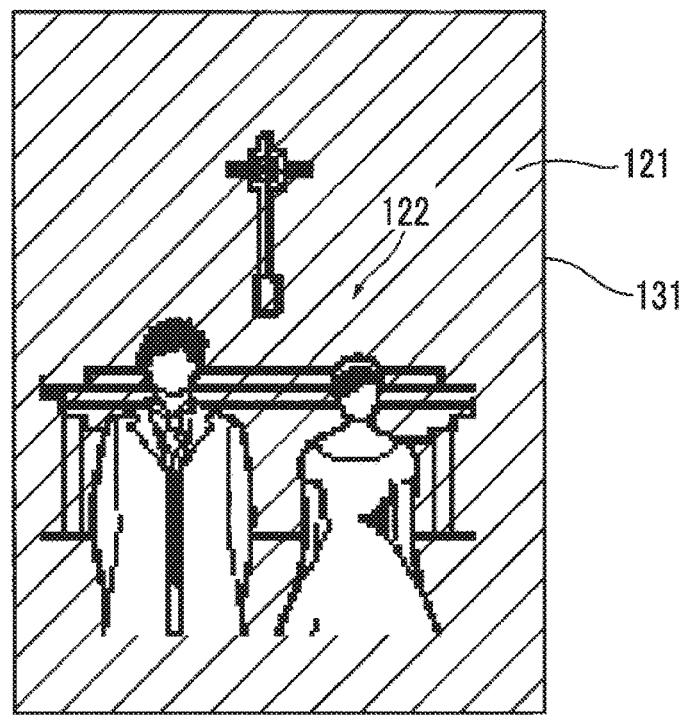
FIG. 15 is a diagram showing an example of an image.
Figure 16:
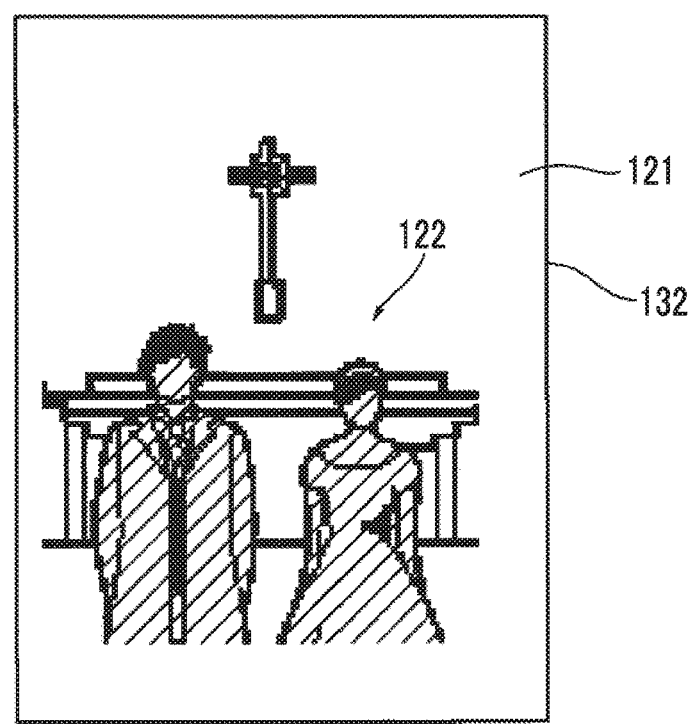
FIG. 16 is a diagram showing an example of another image.

FIGS. 15 and 16 are diagrams showing examples in which display forms of the discrimination target image I5 are set to be different from each other.

FIG. 15 is a diagram showing an example of an image 131 in which the scenery (background) portion 121 is set to be darker than the person portion 122, in the discrimination target image I5. As described in FIG. 14, the detected non-person portion 121 is displayed to be dark by the CPU 2 (an example in which the display forms of the person portion and the non-person portion are different from each other). The dark portion is shown by hatching.

FIG. 16 is a diagram showing an example of an image I32 in which the person portion 122 is set to be darker than the scenery (background) portion 121 in the discrimination target image I5. As described in FIG. 14, the detected person portion 122 is displayed to be dark by the CPU 2 (an example in which the display forms of the person portion and the non-person portion are different from each other). The dark portion is shown by hatching.

As described above, the display forms of the person portion 122 and the non-person portion 121 in the discrimination target image may be different from each other to be displayed on the display screen of the display device 3 by the CPU 2 (a display control device). The person portion 122 and the non-person portion 121 may be displayed using different colors instead of different brightnesses.

Figure 17:
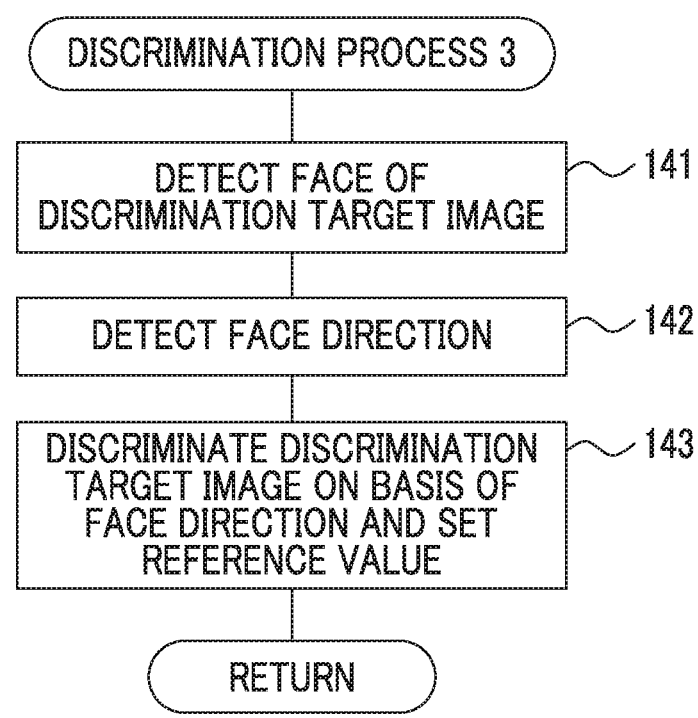
FIG. 17 is a flowchart showing another discrimination processing procedure.

FIG. 17 is a flowchart showing a third discrimination processing procedure (processing procedure of step 35 in FIG. 4).

The process shown in FIG. 17 is performed in a case where the third checkbox 71 is checked on the reference value setting window 50 shown in FIG. 6 and a third reference item is selected. First, the face is detected from the discrimination target image by the CPU 2 (step 141). Then, a direction of the detected face is detected by the CPU 2 (step 142). The direction of the face may be detected from positions of the eyes with respect to the face, spaced distances between the both eyes, a direction of the nose, the size of the mouth, and the like. It is discriminated whether the discrimination target image is the person image or the non-person image on the basis of the detected direction of the face and the reference value set by the third slider 73 of the third slide bar 72 (step 143).

For example, it is assumed that a left end of the third slide bar 72 shown in FIG. 6 represents a case where the direction of the face is right in front and a right end of the third slide bar 72 represents a case where the direction of the face is a backward direction. It is assumed that in a case where the third slider 73 is positioned at the center, it represents that the direction of the face is a lateral direction. In this case, in a case where the calculated direction of the face faces forward with reference to the lateral direction, the discrimination target image is discriminated as the person image, and in a case where the calculated direction of the face is directed backward with reference to the lateral direction, the discrimination target image is discriminated as the non-person image.

With respect to the direction of the face, as described above, data indicating the discrimination target image is transmitted to the artificial intelligence device 20, and a score based on the direction of the face included in the discrimination target image is calculated by the artificial intelligence device 20. Then, the discrimination target image may be discriminated as the person image or the non-person image on the basis of the calculated score and the reference value determined by the position of the third slider 73.

According to the first embodiment, it is possible to discriminate a person image and a non-person image in accordance with a user's intention.

Second Embodiment

Figure 18:
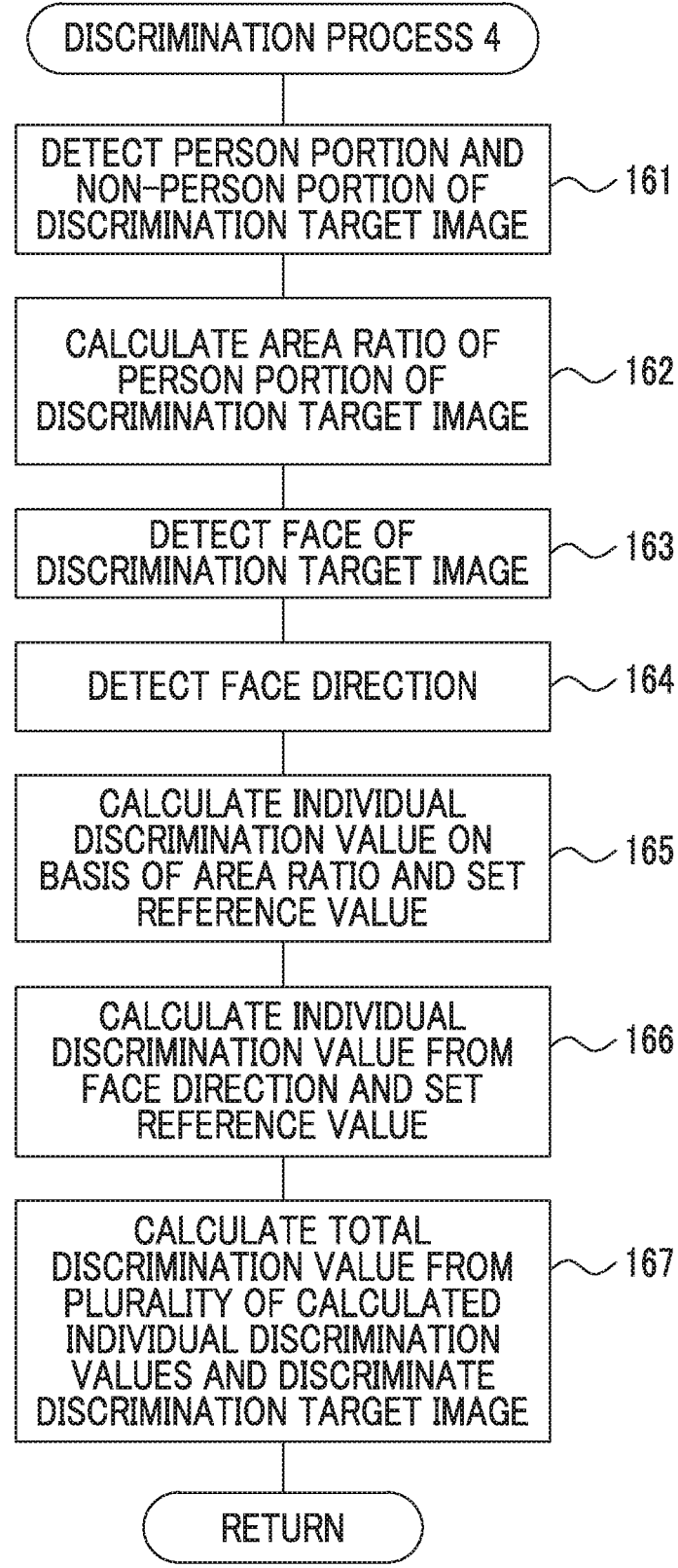
FIG. 18 is a flowchart showing still another discrimination processing procedure.
Figure 19:
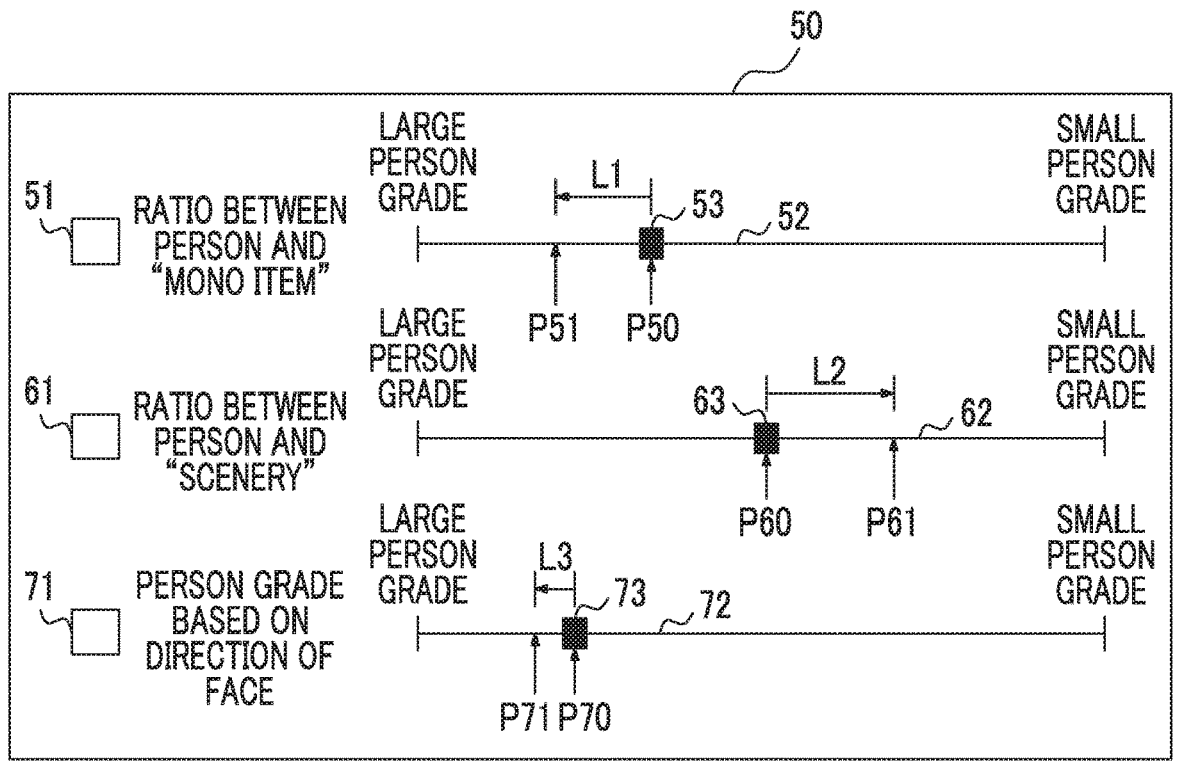
FIG. 19 is a diagram showing an example of a reference value setting window.
Figure 20:
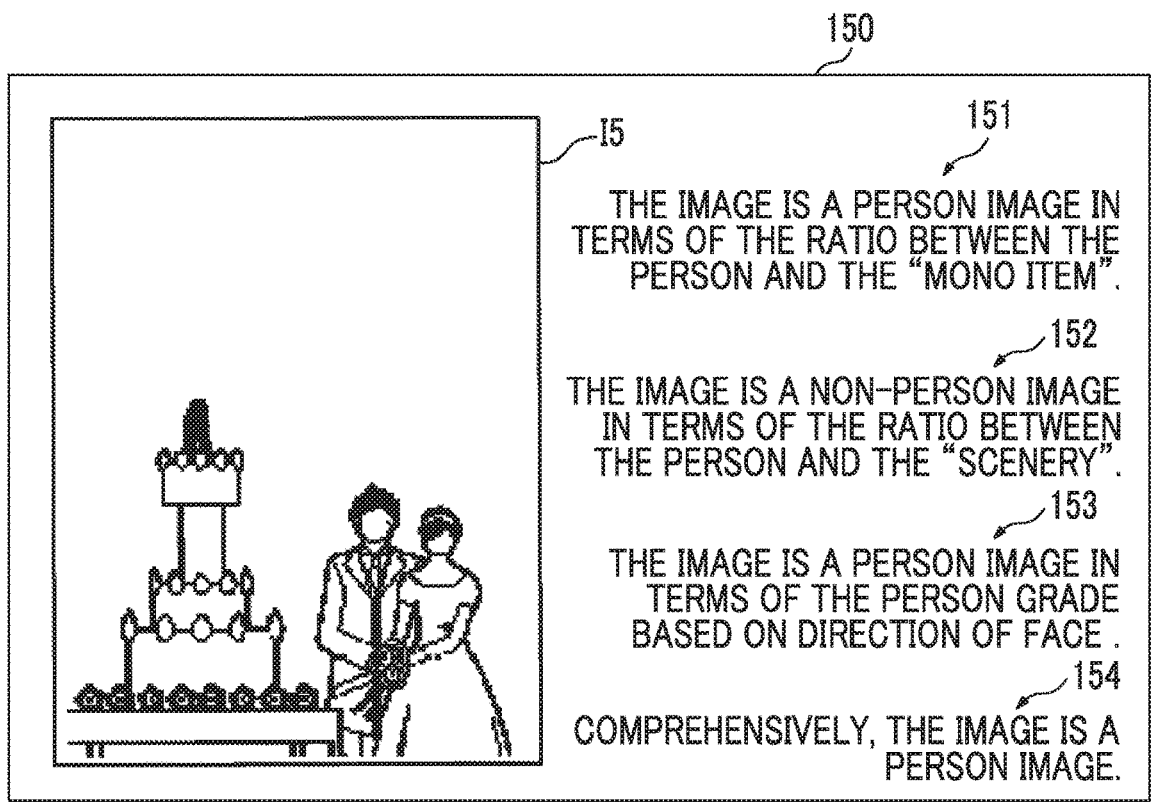
FIG. 20 is a diagram showing an example of a discrimination result display window.

FIGS. 18 to 20 show an embodiment for discriminating whether a discrimination target image is a person image or a non-person image on the basis of a plurality of reference items.

FIG. 18 is a flowchart showing a fourth discrimination processing procedure (processing procedure of step 35 in FIG. 4).

In this process, a plurality of checkboxes among the first checkbox 51, the second checkbox 61, and the third checkbox 71 included in the reference value setting window 50 may be checked. In this embodiment, it is assumed that all of the first checkbox 51, the second checkbox 61, and the third checkbox 71 are checked and reference values of the respective reference items the ratio between the person and the "object item" in the first slider 53, the ratio between the person and the "scenery" in the second slider 63, and of the face direction degree of the person in the third slider 73 are set.

Image data indicating a discrimination target image is read out, and a person portion and a non-person portion included in the discrimination target image are detected by the CPU 2 (step 161). After the first checkbox 51 is checked, the "object item" portion is detected as the non-person portion. Then, after the second checkbox 61 is also checked, the "scenery" portion is detected as the non-person portion. After the person portion and the non-person portion in the discrimination target image are detected, an area ratio between the person portion and the non-person portion is calculated by the CPU 2 (step 162). In the calculation of the area ratio, a first area ratio between the person portion and the "object item" portion and a second area ratio between the person portion and the "scenery" portion are respectively obtained.

Subsequently, the face is detected from the discrimination target image by the CPU 2 (step 163). Then, a direction of the detected face is detected by the CPU 2 (step 164).

Then, on the basis of each area ratio of the calculated first area ratio and second area ratio and the set reference value, an individual discrimination value for the area ratio is calculated by the CPU 2 (step 165). The individual discrimination value calculated on the basis of the area ratio and the set reference value represents a difference between the area ratio and the reference value, and includes a first individual discrimination value calculated on the basis of the first area ratio between the person portion and the "object item" portion and the reference value set by the first slider 53 and a second individual discrimination value calculated on the basis of the second area ratio between the person portion and the "scenery" portion and the reference value set by the second slider 63. Further, an individual discrimination value (which may be referred to as a third individual discrimination value) with respect to the direction of the face is calculated by the CPU 2 on the basis of the direction of the face and the set reference value (step 166). The third individual discrimination value calculated on the basis of the direction of the face and the reference value represents a difference between the detected direction of the face and the reference value. The first to third individual discrimination values are calculated as described later.

FIG. 19 shows the reference value setting window 50.

It is assumed that a value of the first area ratio between the person portion and the "object item" portion corresponds to the position of P51 in the first slide bar 52 (for example, data indicating the first area ratio is transmitted to the artificial intelligence device 20, and a score of a person grade at the first area ratio is calculated on the basis of multiple sample images I stored in the database 21. A position corresponding to the calculated score of the person grade is the position of P51), and the first slider 53 is set at the position of P50 by a user. A distance between the position P50 and the position P51 is indicated by L1. In a case where the position of P51 is placed on a left side with reference to the position P50 of the first slider 53, it is discriminated that the discrimination target image is a person image in the discrimination based on the first area ratio between the person portion and the "object item" portion, and in a case where the position of P51 is placed on a right side with reference to the position P50 of the first slider 53, it is discriminated that the discrimination target image is a non-person image in the discrimination based on the first area ratio between the person portion and the "object item" portion. In the example shown in FIG. 19, since the position of P51 is placed on the left side with reference to the first slider 53, it is discriminated that the discrimination target image is the person image in the discrimination based on the first area ratio between the person portion and the "object item" portion (an example of a discrimination result for each reference value in a reference item), and the distance L1 becomes a positive distance. A value of the distance +L1 corresponds to the first individual discrimination value.

Similarly, it is assumed that a value of the second area ratio between the person portion and the "scenery" portion corresponds to the position of P61 in the second slide bar 62 (for example, data indicating the second area ratio is transmitted to the artificial intelligence device 20, and a score of a person grade at the second area ratio is calculated on the basis of multiple sample images I stored in the database 21. A position corresponding to the calculated score of the person grade is the position of P61), and the second slider 63 is set at the position of P60 by a user. A distance between the position P60 and the position P61 is indicated by L2. In a case where the position of P61 is placed on a left side with reference to the position P60 of the second slider 63, it is discriminated that the discrimination target image is a person image in the discrimination based on the second area ratio between the person portion and the "scenery" portion, and in a case where the position of P61 is placed on a right side with reference to the position P60 of the second slider 63, it is discriminated that the discrimination target image is a non-person image in the discrimination based on the second area ratio between the person portion and the "scenery" portion. Since the position of P61 is placed on the right side with reference to the second slider 63, it is discriminated that the discrimination target image is the non-person image in the discrimination based on the second area ratio between the person portion and the "scenery" portion (an example of a discrimination result for each reference value in a reference item), and the distance L2 becomes a negative distance. A value of the distance −L2 corresponds to the second individual discrimination value.

Similarly, it is assumed that a value of the direction of the face corresponds to the position of P71 in the third slide bar 72, and the third slider 73 is set at the position of P70 by a user. A distance between the position P70 and the position P71 is indicated by L3. In a case where the position of P71 is placed on a left side with reference to the position P70 of the third slider 73, it is discriminated that the discrimination target image is a person image in the discrimination based on the direction of the face, and in a case where the position of P71 is placed on a right side with reference to the position P70 of the third slider 73, it is discriminated that the discrimination target image is a non-person image in the discrimination based on the direction of the face. Since the position of P71 is placed on the left side with reference to the third slider 73, it is discriminated that the discrimination target image is the person image in the discrimination based on the direction of the face (an example of a discrimination result for each reference value in a reference item), and the distance L3 becomes a positive distance. A value of the distance +L3 corresponds to the third individual discrimination value.

A total discrimination value is calculated from the first individual discrimination value, the second individual discrimination value, and the third individual discrimination value obtained in this way, and the CPU 2 discriminates whether the discrimination target image is a person image or a non-person image (step 167). For example, an added value of the first individual discrimination value, the second individual discrimination value, and the third individual discrimination value may be set as the total discrimination value (in a case where the added value is positive, the CPU 2 discriminates that the discrimination target image is the person image, and in a case where the added value is negative, the CPU 2 discriminates that the discrimination target image is the non-person image). Alternatively, priorities may be set, and weighting with respect to the first individual discrimination value, the second individual discrimination value, and the third individual discrimination value may be performed in accordance with the priorities, and then, an added value after the weighting may be set as the total discrimination value.

FIG. 20 is a diagram showing an example of a discrimination result display window 150.

The discrimination result display window 150 is also displayed on the display screen of the display device 3 of the image discrimination apparatus 1. A discrimination target image I5 is displayed on the discrimination result display window 150. On a right side of the discrimination target image I5, a sentence 151 that represents a discrimination result based on a first individual discrimination value, a sentence 152 that represents a discrimination result based on a second individual discrimination value, and a sentence 153 that represents a discrimination result based on a third individual discrimination value, and a sentence 154 that represents a discrimination result based on a total discrimination value are displayed (an example of outputs of discrimination results in a plurality of reference items). A user can comprehensively understand whether the discrimination target image I5 is discriminated as a person image or a non-person image, and can understand a discrimination result based on each of the first individual discrimination value, the second individual discrimination value, and the third individual discrimination value.

According to the second embodiment, it is possible to comprehensively understand whether a discrimination target image is a person image or a non-person image on the basis of a plurality of reference items. Further, it is possible to understand a discrimination result based on each of the plurality of reference items.

Third Embodiment

Figure 21:
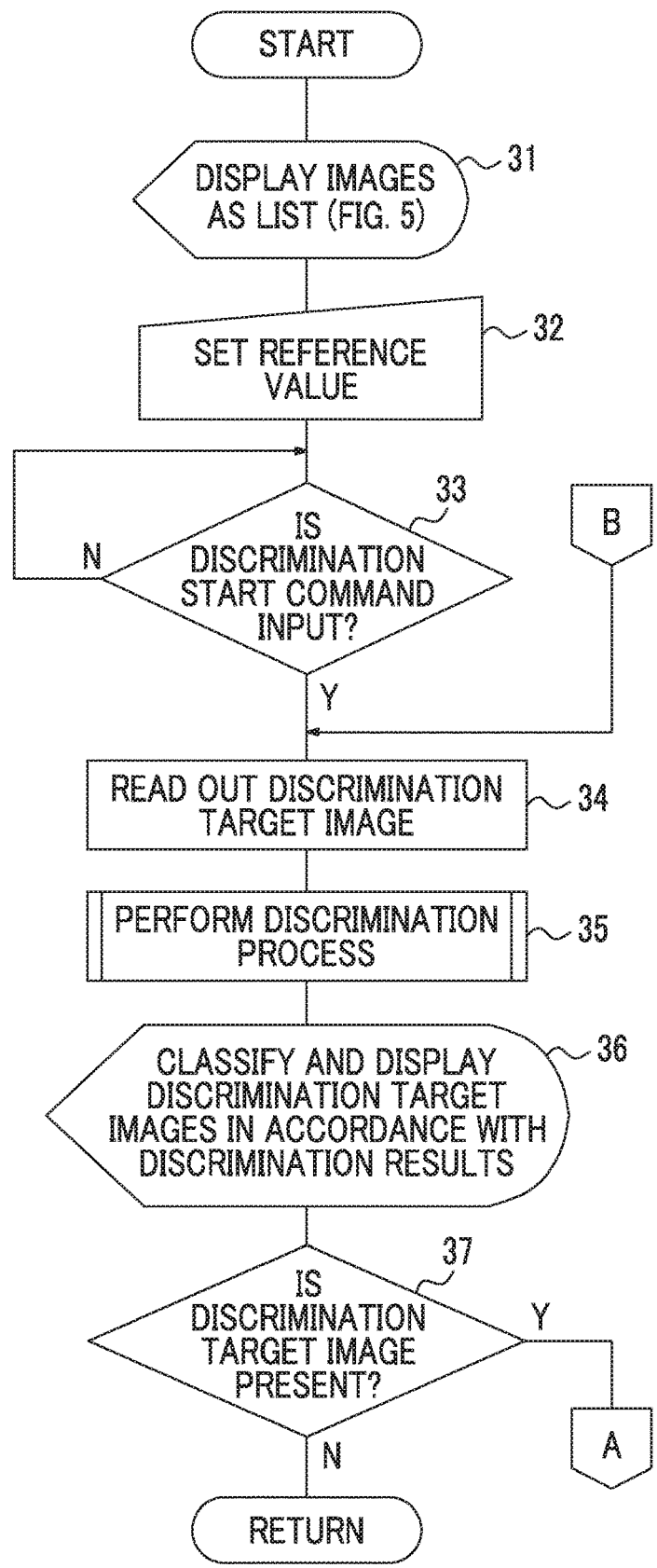
FIG. 21 is a flowchart showing a processing procedure of the image discrimination apparatus.
Figure 22:
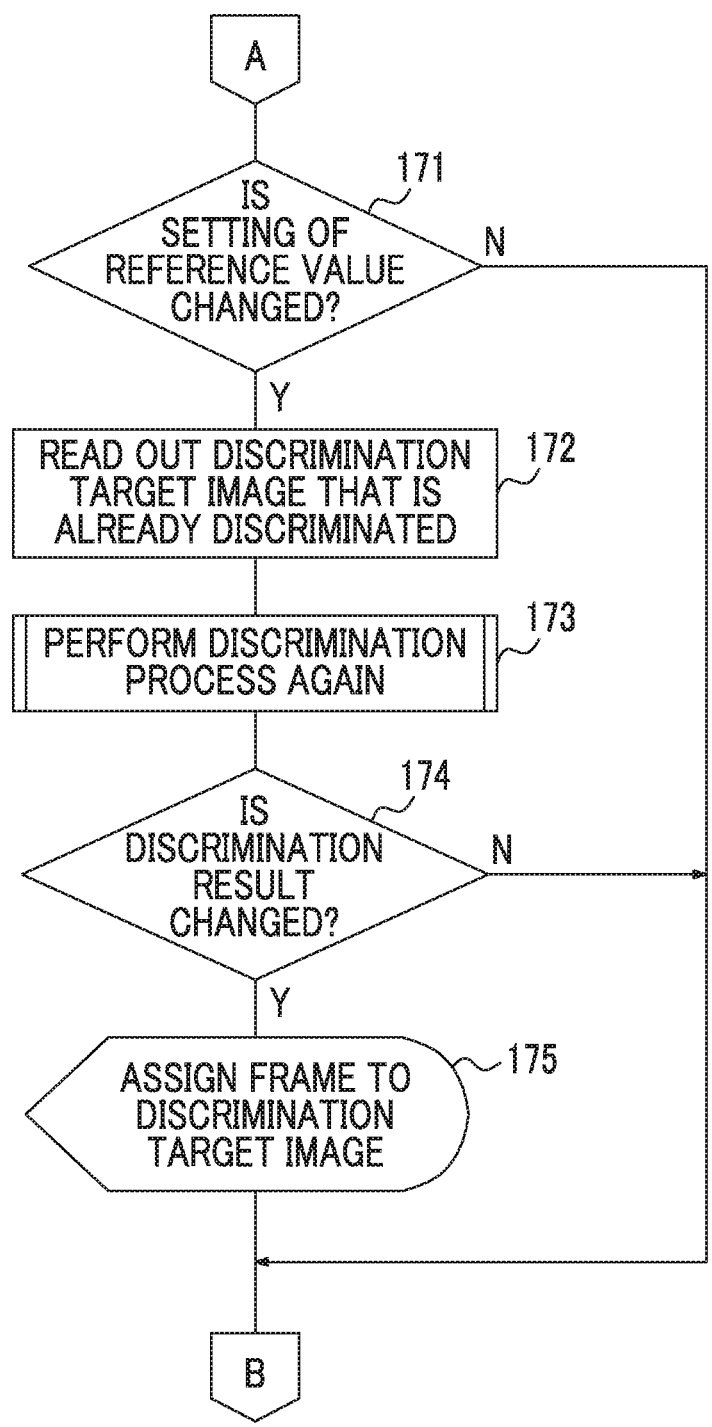
FIG. 22 is a flowchart showing a processing procedure of the image discrimination apparatus.
Figure 23:
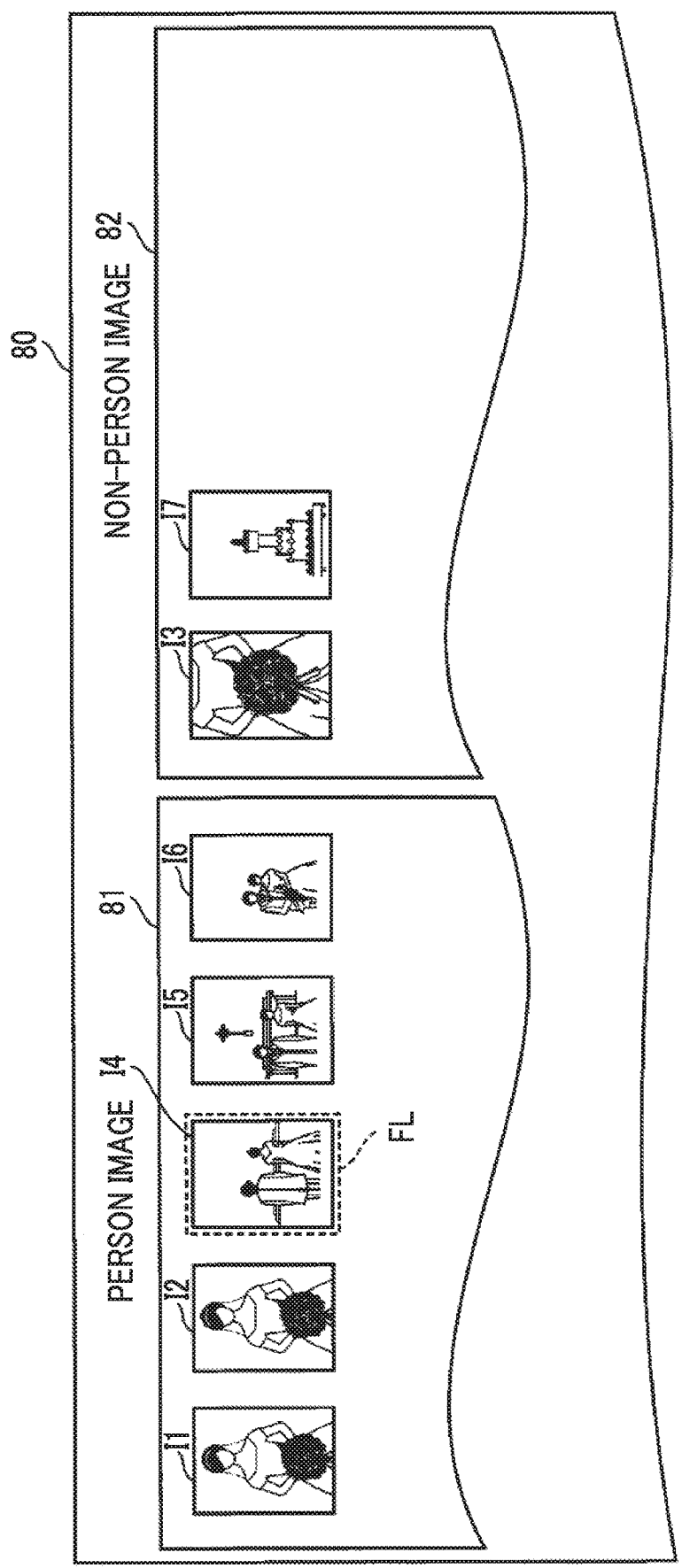
FIG. 23 is a diagram showing an example of a discrimination result display window.

FIGS. 21 to 23 are diagrams showing another embodiment, which is an embodiment in a case where a reference value is changed after discrimination results indicating whether a plurality of discrimination target images are person images or non-person images are obtained.

FIGS. 21 and 22 are flowcharts showing a processing procedure of the image discrimination apparatus 1. In FIGS. 21 and 22, the same reference numerals are given to the same processes as in the processes shown in FIG. 4.

A plurality of discrimination target images are displayed on the display screen of the display device 3 (step 31), and a reference value (which may be one or plural) is set by a user using the reference value setting window 50 shown in FIG. 6 (step 32). In a case where a discrimination start command is input (YES in step 33), each discrimination target image is read out (step 34), and then, a discrimination process is performed (step 35). As shown in FIG. 10, the discrimination target images are classified and displayed in accordance with discrimination results (step 36). In a case where a discrimination target image is present (YES in step 37), it is checked whether setting of a reference value is changed (step 171 in FIG. 22).

In a case where a checked box among the first checkbox 51, the second checkbox 61, and the third checkbox 71 included in the reference value setting window 50 is changed, or in a case where the position of a certain slider among the first slider 53, the second slider 63, and the third slider 73 corresponding to the checked box is changed, the CPU 2 determines that the setting of the reference value is changed.

In a case where the setting of the reference value is changed (YES in step 171), image data indicating the discrimination target images that have already been discriminated is read out again (step 172), and the discrimination process is performed again on the basis of the changed reference value (step 173). In a case where a discrimination result is changed due to the change of the reference value (YES in step 174), a frame is assigned to the discrimination target image for which the discrimination result is changed (step 175).

FIG. 23 is a diagram showing an example of an image classification window 80.

The image classification window 80 includes a person image window 81 and a non-person image window 82. On the person image window 81, discrimination target images I1, I2, and I4 to I6 that are discriminated as person images before setting of a reference value is changed are displayed. On the non-person image window 82, discrimination target images I3 and I7 that are discriminated as non-person images before the setting of the reference value is changed are displayed. It is assumed that as the setting of the reference value is changed and the discrimination process is performed again, the discrimination target image I4 that has been discriminated as the person image is discriminated as the non-person image. Then, the CPU 2 (an example of a notification control device) assigns a frame FL to the discrimination target image I4. A user can understand that the discrimination result is changed due to the change of the reference value while viewing the assigned frame FL (an example of change of a notification form). It can be understood that the discrimination target image I4 is discriminated as the person image before the change of the reference value and is discriminated as the non-person image due to the change of the reference value. In FIG. 23, before the change of the reference value, the discrimination target image I4 is displayed on the person image window 81 (an example of a notification device), and similarly, in a case where the reference value is changed and the discrimination result is changed from the person image to the non-person image, the discrimination target image I4 is displayed on the person image window 81, but as the reference value is changed, the discrimination target image I4 may be switched from the display on the person image window 81 to display on the non-person image window 82 (an example of change of a notification form). In this case, the frame FL may be assigned to easily understand that the discrimination result is changed, but may not be assigned.

Returning to FIG. 22, in a case where the setting of the reference value is not changed (NO in step 171), in a case where the discrimination result is not changed (NO in step 174), or in a case where the frame is assigned to the discrimination target image in accordance with the discrimination result (step 175), image data indicating the next discrimination target image for which the discrimination process is not performed is read out (step 34 in FIG. 21), and then, the discrimination process is performed (step 35).

Figure 24:
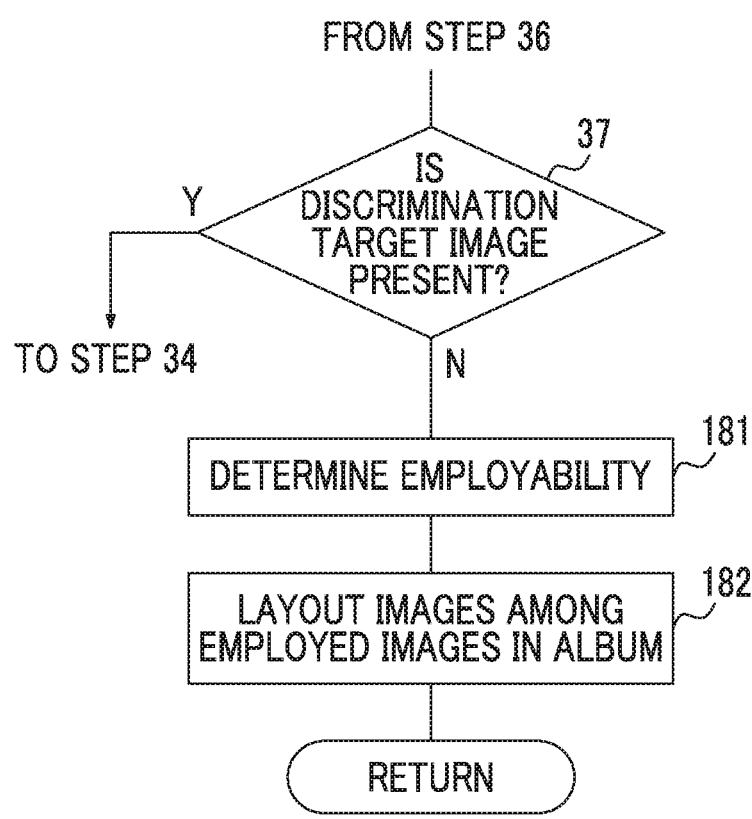
FIG. 24 shows a part of the flowchart showing the processing procedure of the image discrimination apparatus.

FIG. 24 shows a modification example, and shows a part of the flowchart showing the processing procedure of the image discrimination apparatus 1.

The process shown in FIG. 24 is performed subsequently to the process of step 36 shown in FIG. 4.

In a case where the discrimination process is terminated with respect to all the discrimination target images (NO in step 37), the CPU 2 (an employability determination device) determines whether the discrimination target images discriminated as the person images and the discrimination target images discriminated as the non-person images are employable in an album (step 181). For example, in a case where an album is created only using the person images without using the non-person images, person images to be used in the album are determined on the basis of the degree of blurriness, the degree of brightness, the position of a main person, or the like from the images discriminated as the person images, paste positions of the determined person images are determined by the CPU 2 (a positioning device), so that the album is created (step 182). A user may determine the paste positions. Contrarily, in a case where an album is created only using the non-person images without using the person images, non-person images to be used in the album are determined from the images discriminated as the non-person images (step 181), and paste positions of the determined non-person images are determined by the CPU 2 (the positioning device), so that the album is created (step 182). Thus, for example, it is possible to create an album of images discriminated as person images and an album of images discriminated as non-person images.

Further, instead of the album of the images discriminated as the person images and the album of the images discriminated as the non-person images, an album may be created on the basis of the images discriminated as the person images and the images discriminated as the non-person images. For example, images to be employed in an album may be determined by the CPU 2 (an employability determination device) so that a ratio between images discriminated as person images and images discriminated as non-person images becomes a predetermined ratio (step 181), paste positions may be determined by the CPU 2 (the positioning devices) using the determined images, so that the album may be created (step 182).

According to the third embodiment, it can be understood that as a reference value is changed, a discrimination result of a discrimination target image is changed. Further, it is possible to make an album in accordance with discrimination results of discrimination target images.

In the above-described embodiment, a case where multiple images that are discrimination targets are discriminated as person images or non-person images has been described, but a configuration in which in a state where images are discriminated as person images (first-stage discrimination process), the person images are further discriminated as "more person-like person images" and "non-person-like person images" (second-stage discrimination process) may be used. For example, in a certain reference item, a configuration in which a sub-slider is provided at a position based on a side of a large person grade with reference to the above-described slider and "the more person-like person images" and "the non-person-like person images" are discriminated using the person grade indicated by the sub-slider as a reference value may be used. Similarly, the non-person images may be further discriminated as "more non-person-like non-person images" and "person-like non-person images".

In the above-described embodiment, the image discrimination apparatus 1 may be realized using a personal computer or the like, and may be realized using a multi-functional portable phone such as a smartphone or a plate-like computer such as a tablet.

As the processing unit that executes the above-described processes, instead of the CPU 2 that executes software to function as a variety of processing units, for example, a dedicated electric circuit that is a processor having a circuit configuration that is dedicatedly designed for executing a specific process, such as a programmable logic device of which a circuit configuration is changeable after manufacturing such as a field-programmable gate array (FPGA), or an application specific integrated circuit (ASIC) may be used.

One processing unit may be configured of one processor among the variety of processors, or may be configured of a combination of two or more same or different kinds of processors (for example, a combination of a plurality of FPGAs, or a combination of a CPU and an FPGA). As an example in which a plurality of processing units is configured as one processor, first, there is a configuration in which one processor is configured of a combination of one or more CPUs and software and the processor functions as the plurality of processing units, as represented by a computer such as a client computer or a server. Secondly, as represented by a system-on-chip, or the like, there is a configuration in which a processor that realizes overall functions of a system that includes a plurality of processing units using one integrated circuit (IC) chip is used. In this way, various processing units may be configured by using one or more various processors as a hardware structure.

Further, more specifically, the hardware structure of the various processors is an electric circuit in which circuit elements such as semiconductor elements are combined.

EXPLANATION OF REFERENCES

1: image discrimination apparatus

What is claimed is:
1. An image discrimination apparatus comprising:
a reference value setting device configured to allow a user to set a reference value for setting the reference value of discriminating a person image or a non-person image when the value of reference item is equal to or larger than the reference value in at least one reference item;
a processor configured to discriminate whether a discrimination target image is a person image or a non-person image on the basis of the reference value set by the user using the reference value setting device; and
a display control device configured to display an image which is discriminated to person images by the processor to a person image display area, and further configured to identify and display the image in the person image display area even if it is determined to be a non-person image due to a change in the reference value.

2. An image discrimination apparatus comprising:
a reference value setting device configured to allow a user to set a reference value for setting the reference value of discriminating a person image or a non-person image when the value of reference item is equal to or larger than the reference value in at least one reference item; and
a processor configured to discriminate whether a discrimination target image is a person image or a non-person image on the basis of the reference value set by the user using the reference value setting device,
wherein a plurality of sample images for setting the reference value are displayed in order of a person image likeness.

3. The image discrimination apparatus according to claim 2,
wherein the processor is configured to discriminate whether the discrimination target image is the person image or the non-person image on the basis of an evaluation value indicating a person image likeness or a non-person image likeness of the discrimination target image, obtained on the basis of a plurality of sample images, and the reference value set by the reference value setting device.

4. The image discrimination apparatus according to claim 2,
wherein the reference item is an area ratio between a person portion and a non-person portion in the discrimination target image,
wherein the processor is configured to detect the person portion and the non-person portion in the discrimination target image, and
wherein the processor is configured to discriminate whether the discrimination target image is the person image or the non-person image on the basis of the area ratio between the person portion and the non-person portion in the discrimination target image detected by the processor and the reference value set by the reference value setting device.

5. The image discrimination apparatus according to claim 4, further comprising:

a display control device configured to change display forms of the person portion and the non-person portion in the discrimination target image detected by the processor to display the discrimination target image.

6. The image discrimination apparatus according to claim 2,
wherein the processor is configured to discriminate whether the discrimination target image is the person image or the non-person image on the basis of a direction of a face of a person in the discrimination target image and the reference value set by the reference value setting device.

7. The image discrimination apparatus according to claim 2,
wherein the reference item is a ratio between a person and an object other than the person included in the discrimination target image.

8. The image discrimination apparatus according to claim 2,
wherein the reference item is a ratio between a person and scenery included in the discrimination target image.

9. The image discrimination apparatus according to claim 2,
wherein the reference item is a degree indicating how much a face of a person included in the discrimination target image faces forward.

10. The image discrimination apparatus according to claim 2,
wherein a plurality of the reference items are provided, and
wherein the processor is configured to perform the discrimination of the discrimination target image for each reference value in each of the reference items set by a plurality of the reference value setting device, and output a discrimination result for each reference value.

11. The image discrimination apparatus according to claim 10,
wherein the processor is configured to discriminate whether the discrimination target image is the person image or the non-person image on the basis of the discrimination results for the plurality of reference items.

12. The image discrimination apparatus according to claim 2, further comprising:
a notification device configured to notify a discrimination result in the processor; and
a notification control device configured to change a notification form in the notification device as the discrimination result in the processor is changed according to change in a setting of the reference value in the reference value setting device.

13. The image discrimination apparatus according to claim 2, further comprising:
an employability determination device configured to determine whether the discrimination target image is employable on the basis of a discrimination result in the processor.

14. The image discrimination apparatus according to claim 13, further comprising:
a positioning device configured to determine a paste position in an album with respect to the discrimination target image determined to be employable by the employability determination device on the basis of the discrimination result in the processor.

15. The image discrimination apparatus according to claim 14,
wherein the positioning device is configured to determine the paste position of the person image and non-person image based on an album story.

16. The image discrimination apparatus according to claim 2, further comprising:
a display control device configured to display sample images corresponding to the reference value to a display screen.

17. The image discrimination apparatus according to claim 2, further comprising:
a display control device configured to display sample images,
wherein the user sets the reference value with the reference value setting device by specifying the sample images as person or non-person images.

18. The image discrimination apparatus according to claim 2,
wherein the processor is configured to discriminate whether a discrimination target image is a person image or a non-person image based on whether a ratio between a person in the discrimination target image and objects the person has is above a threshold.

19. The image discrimination apparatus according to claim 2,
wherein the processor is configured to discriminate whether a discrimination target image is a person image or a non-person image based on whether a ratio between a person in the discrimination target image and scenery in a background of the person is above a threshold.

20. The image discrimination apparatus according to claim 2, further comprising:
a display control device configured to display an image which is discriminated to person images by the processor to a person image display area, and further configured to identify and display the image in the person image display area even if it is determined to be a non-person image due to a change in the reference value.

21. The image discrimination apparatus according to claim 2,
wherein a movable slider, which sets a reference value, associated with the plurality of sample images is displayed.

22. The image discrimination apparatus according to claim 21,
wherein the reference value setting device sets the reference value in accordance with the relation of the position of the slider and the position of each sample image.

23. An image discrimination method comprising:
setting a reference value based on a user setting the reference value of discriminating a person image or a non-person image when the value of reference item is equal to or larger than the reference value in at least one reference item, using a reference value setting device; and
discriminating whether a discrimination target image is a person image or a non-person image on the basis of the reference value set by the user, using a processor,
wherein a plurality of sample images for setting the reference value are displayed in order of a person image likeness.

24. A non-transitory computer readable recording medium storing a computer-readable program for controlling a computer of an image discrimination apparatus, the program causing the computer to execute:

setting a reference value based on a user setting the reference value of discriminating a person image or a non-person image when the value of reference item is equal to or larger than the reference value in at least one reference item; and discriminating whether a discrimination target image is a person image or a non-person image on the basis of the reference value set by the user, wherein a plurality of sample images for setting the reference value are displayed in order of a person image likeness.

25. An image discrimination method comprising:

setting a reference value based on a user setting the reference value of discriminating a person image or a non-person image when the value of reference item is equal to or larger than the reference value in at least one reference item, using a reference value setting device;

discriminating whether a discrimination target image is a person image or a non-person image on the basis of the reference value set by the user, using a processor; and displaying an image which is discriminated to person images by the processor to a person image display area, and identifying and displaying the image in the person image display area even if it is determined to be a non-person image due to a change in the reference value.

26. A non-transitory computer readable recording medium storing a computer-readable program for controlling a computer of an image discrimination apparatus, the program causing the computer to execute:

setting a reference value based on a user setting the reference value of discriminating a person image or a non-person image when the value of reference item is equal to or larger than the reference value in at least one reference item;

discriminating whether a discrimination target image is a person image or a non-person image on the basis of the reference value set by the user; and displaying an image which is discriminated to person images by the processor to a person image display area, and identifying and displaying the image in the person image display area even if it is determined to be a non-person image due to a change in the reference value.

* * * * *